US010205560B2

(12) United States Patent
Fong et al.

(10) Patent No.: US 10,205,560 B2
(45) Date of Patent: Feb. 12, 2019

(54) METHODS AND SYSTEMS FOR HARQ PROTOCOLS

(71) Applicant: Apple Inc., Cupertino, CA (US)

(72) Inventors: Mo-han Fong, Sunnyvale, CA (US); Sophie Vrzic, Nepean (CA); Robert Novak, Ottawa (CA); Jun Yuan, Ottawa (CA); Dong-Sheng Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 15/491,530

(22) Filed: Apr. 19, 2017

(65) Prior Publication Data

US 2017/0222762 A1  Aug. 3, 2017

Related U.S. Application Data

(63) Continuation of application No. 15/168,669, filed on May 31, 2016, now Pat. No. 9,654,258, which is a (Continued)

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/0003* (2013.01); *H04L 1/0009* (2013.01);
(Continued)

(58) Field of Classification Search
CPC ... H04L 1/1812; H04L 1/1861; H04L 1/1887; H04L 1/1896; H04L 1/0025;
(Continued)

(56) References Cited

U.S. PATENT DOCUMENTS 8,259,630 B2   9/2012  Liu et al.
8,527,829 B2   9/2013  Fong et al.
(Continued)

FOREIGN PATENT DOCUMENTS

CN   1855801   11/2006
CN   1930816    3/2007
(Continued)

OTHER PUBLICATIONS

Office Action for Chinese Patent Application No. 201510565829.0, dated Dec. 26, 2017, pp. 1-8.
(Continued)

*Primary Examiner* — Guerrier Merant
(74) *Attorney, Agent, or Firm* — Meyertons, Hood, Kivlin, Kowert & Goetzel, P.C.

(57) ABSTRACT

Methods described herein are for wireless communication systems. One aspect of the invention is directed to a method for a HARQ process, in which the HARQ process includes a first transmission of an encoder packet and at least one retransmission. The method involves allocating a transmission resource for each respective transmission. The method involves transmitting control information from a base station to a mobile station for each respective transmission. The control information includes information to uniquely identify the HARQ process and an identification of one of a time resource, a frequency resource and a time and frequency resource that is allocated for the transmission. In some embodiments of the invention, specific control information is signalled from a base station to a mobile station to enable RAS-HARQ operation. In some embodiments of the invention, retransmission signaling in included as part of regular unicast signaling used for both first transmission and retransmissions. In some embodiments of the invention, a 3-state acknowledgement channel and associated error recovery (Continued)

operation enables the base station and mobile station to recover from control signaling error and reduce packet loss.

20 Claims, 26 Drawing Sheets

Related U.S. Application Data continuation of application No. 14/918,934, filed on Oct. 21, 2015, now Pat. No. 9,374,198, which is a continuation of application No. 14/500,468, filed on Sep. 29, 2014, now Pat. No. 9,197,377, which is a continuation of application No. 14/012,166, filed on Aug. 28, 2013, now Pat. No. 8,959,410, which is a continuation of application No. 12/988,717, filed as application No. PCT/CA2009/000522 on Apr. 21, 2009, now Pat. No. 8,527,829.

(60) Provisional application No. 61/050,329, filed on May 5, 2008, provisional application No. 61/046,625, filed on Apr. 21, 2008.

(51) Int. Cl.

| | | |
|---|---|---|
| *H04W 72/12* | (2009.01) | |
| *H04W 72/00* | (2009.01) | |
| *H04L 5/14* | (2006.01) | |
| *H04L 5/00* | (2006.01) | |
| *H04L 1/00* | (2006.01) | |
| *H04L 27/26* | (2006.01) | |
| *H04W 88/04* | (2009.01) | |
| *H04W 88/06* | (2009.01) | |
| *H04W 28/04* | (2009.01) | |

(52) U.S. Cl.
CPC .......... *H04L 1/1816* (2013.01); *H04L 1/1861* (2013.01); *H04L 1/1887* (2013.01); *H04L 1/1896* (2013.01); *H04L 5/0055* (2013.01); *H04L 5/14* (2013.01); *H04L 27/2659* (2013.01); *H04L 27/2666* (2013.01); *H04W 72/005* (2013.01); *H04W 72/042* (2013.01); *H04W 72/044* (2013.01); *H04W 72/0446* (2013.01); *H04W 72/0453* (2013.01); *H04W 72/1268* (2013.01); *H04W 28/04* (2013.01); *H04W 72/1257* (2013.01); *H04W 88/04* (2013.01); *H04W 88/06* (2013.01)

(58) Field of Classification Search
CPC ... H04L 1/0027; H04L 1/0003; H04L 1/0007; H04L 1/0009; H04L 1/0026; H04L 47/14; H04L 63/0428; H04L 63/123; H04L 5/0007; H04L 5/0096; H04L 5/0094; H04W 72/1268; H04W 72/005; H04W 28/04; H04W 72/0446; H04W 72/0453; H04W 72/1257; H04W 48/12; H04W 72/10; H04W 28/06; H04W 72/04; H04W 72/121; H04W 28/10; H04W 12/02; H04W 16/26; H04W 84/047; H04W 72/1226; H04W 72/1278; H04W 68/00; H04W 36/30; H04W 36/08; H04W 74/085; H04W 28/16; H04W 92/02; H04W 88/08; H04W 88/16; H04J 13/0044; H04B 7/155; H04B 7/2628; H04B 7/2643
See application file for complete search history.

(56) References Cited

U.S. PATENT DOCUMENTS

| | | |
|---|---|---|
| 9,197,377 B2 | 11/2015 | Fong et al. |
| 9,374,198 B2 | 6/2016 | Fong et al. |
| 2004/0153909 A1 | 8/2004 | Lim et al. |
| 2006/0240859 A1 | 10/2006 | Gervais et al. |
| 2006/0292992 A1 | 12/2006 | Tajima et al. |
| 2007/0109988 A1 | 5/2007 | Sampath |
| 2007/0129645 A1 | 6/2007 | Hartley et al. |
| 2007/0195809 A1 | 8/2007 | Blanz et al. |
| 2007/0263740 A1 | 11/2007 | Kwon et al. |
| 2010/0046451 A1 | 2/2010 | Tada et al. |
| 2011/0310784 A1 | 12/2011 | Park |
| 2011/0317650 A1 | 12/2011 | Venkatachalam et al. |

FOREIGN PATENT DOCUMENTS

| | | |
|---|---|---|
| CN | 101127552 | 2/2008 |
| CN | 101132260 | 2/2008 |
| CN | 101136727 | 3/2008 |
| CN | 101138190 | 3/2008 |
| EP | 1463230 A2 | 9/2004 |
| EP | 1855411 A2 | 11/2007 |
| EP | 1833203 A1 | 12/2007 |
| WO | 2005060145 A1 | 6/2005 |
| WO | 2005062486 A1 | 7/2005 |
| WO | 2006071049 A1 | 7/2006 |
| WO | 2006120524 A1 | 11/2006 |
| WO | 2007024012 | 3/2007 |
| WO | 2007045101 A2 | 4/2007 |
| WO | 2007073678 A1 | 7/2007 |
| WO | 2007079085 A2 | 7/2007 |
| WO | 2007129645 A1 | 11/2007 |
| WO | 2008014275 A2 | 1/2008 |
| WO | 2008041824 A2 | 4/2008 |

OTHER PUBLICATIONS

Office Action for European Patent Application No. 16183544.2, dated Mar. 23, 2018, pp. 1-7.
Motorola, "HARQ considerations for E-UTRA", 3GPP TSG RAN1#44, R1-060395, Denver, USA, Feb. 13-17, 2006, pp. 1-5.
Pantelis Monogioudis et al., "Updated Lucent-Nortel-Samsung proposal for Air Interface Evolution Phase 2", 3GPP2; pp. 1-84. vol. TSGC May 24, 2006 (May 24, 2006), pp. 1-84, XP062204855, Retrieved from the Internet: URL:http://ftp.3gpp2.org/TSGC/Working/2006/2006-05-Denver/TSGC- 2006-05-Denver/WG3/ [retrieved on May 24, 2006].
Mo-Han Fong, et al., Proposal for IEEE 802.16m Frame Structure for Single Band Operation, IEEE C802.16m-08/041r1, IEEE Internet <URL:http://www.ieee802.org/16/tgm/docs/C80216m-08 04 Irl .pdf>, Jan. 17, 2008, pp. 1-15.
Office Action for Japanese Patent Application No. 2016-133126, dated Jun. 28, 2017, pp. 1-2.
Nortel, "HARQ Process ID's for DL Persistent scheduling", 3GPP Draft; R2-080342 DL Persistent HARQ IDS, 3rd Generation Partnership Project (3GPP), Mobile Competence Centre, RAN WG2, Sevilla, Spain, Jan. 7, 2008, 6 pages.
Cati, "HARQ Process ID for downlink semi-persistent scheduling", 3GPP Draft, R2-080560, 3rd Generation Partnership Project (3GPP), Mobile Competence Centre, RAN WG2, Sevilla, Spain, Jan. 22, 2008, 3 pages.
Novak et al., Nortel Networks, "Proposal for IEEE 802.16m VoIP Resource Allocation and Control Structure", IEEE, Piscataway, NJ, U.S.A., IEEE C802.16m-08/177rl, Mar. 10, 2008, 27 pages.
Examination Report for corresponding European Patent Application No. 09734613.4, dated Jul. 27, 2012, 7 pages.
Vrzic et al., "Proposal for IEEE 802.16m Resource Allocation and Control Structure", Nortel Networks, IEEE C802.16m-08/176, Mar. 10, 2008, http://wirelessman.org/lgm/contrib/C80216m-08_ 176.pdf, 25 pages.
Fong et al., "Proposal for IEEE 802.16m HARQ Protocol and Timing", Nortel Networks, IEEE C802.16m-08/353, May 5, 2008,

(56) References Cited

OTHER PUBLICATIONS http://wirelessman.org/Igm/contrib/C80216m-08_353.pdf, 16 pages.
International Search Report for corresponding PCT Patent Application No. PCT/CA2009/000522, dated Sep. 17, 2009, 3 pages.
Notice of Allowance from Japanese Application No. 2011505328, dated Feb. 9, 2015, English and Japanese versions, pp. 1-6.
Vrzic et al., "Proposal for IEEE 802.16m Resource Allocation and Control Structure for Multi-Carrier Operation", Mar. 8, 2008, pp. 1-8.
Office Action from Chinese Application No. 200980123191.8, dated Dec. 15, 2014, English and Chinese versions, pp. 1-12.
Park et al., "Downlink Control Structure Related to Hybrid-ARO Structure", Mar. 16, 2008, pp. 1-12.
U.S. Appl. No. 14/012,166, filed Aug. 28, 2013, Mo-Han Fong.
Office Action from Japanese Patent Application No. 2011-505328, dated Sep. 4, 2013, English Translation and Japanese Versions, pp. 1-4.
Office Action from Chinese Application No. 200980123191.8, dated Jun. 19, 2014 English and Chinese versions, pp. 1-14.
Final Office Action from Japanese Application No. 2011-505328, dated Jun. 25, 2014, English and Japanese versions, pp. 1-6.
Office Action, including English-language translation thereof, dated Sep. 2, 2013 for corresponding Japanese Patent Application No. 2011-505328, 7 pages.
Office Action, Korean Application No. 10-2010-7026042, dated Sep. 17, 2015, 8 pages.
Mo-Han Fong et al., "Proposal for IEEE 802.16m Frame Structure for Single Band Operation", Slides S802, 16m-08/041, IEEE Internet <URL:http://www.ieee802.org/16/tgm/docs/280216m-08_041, Jan. 16, 2008, pp. 1-15.
Park et al., "Downlink Control Structure related to Hybrid-ARQ", IEEE 802.16 Broadband Wireless Access Working Group, IEEE C802.16m-08/151, Mar. 11, 2008, pp. 1-3.
K. Rui et al., "Downlink Control Channel Design of IEEE 802.16m," IEEE 802.16 Broadband Wireless Access Working Group, IEEE C802.16m-08/224r2, Mar. 17, 2008, pp. 1-3.
Office Action for Korean Patent Application No. 10-2017-7025634, dated Dec. 15, 2017, pp. 1-3.
Office Action for Chinese Patent Application No. 201410638127.6, dated Apr. 5, 2017, pp. 1-5.

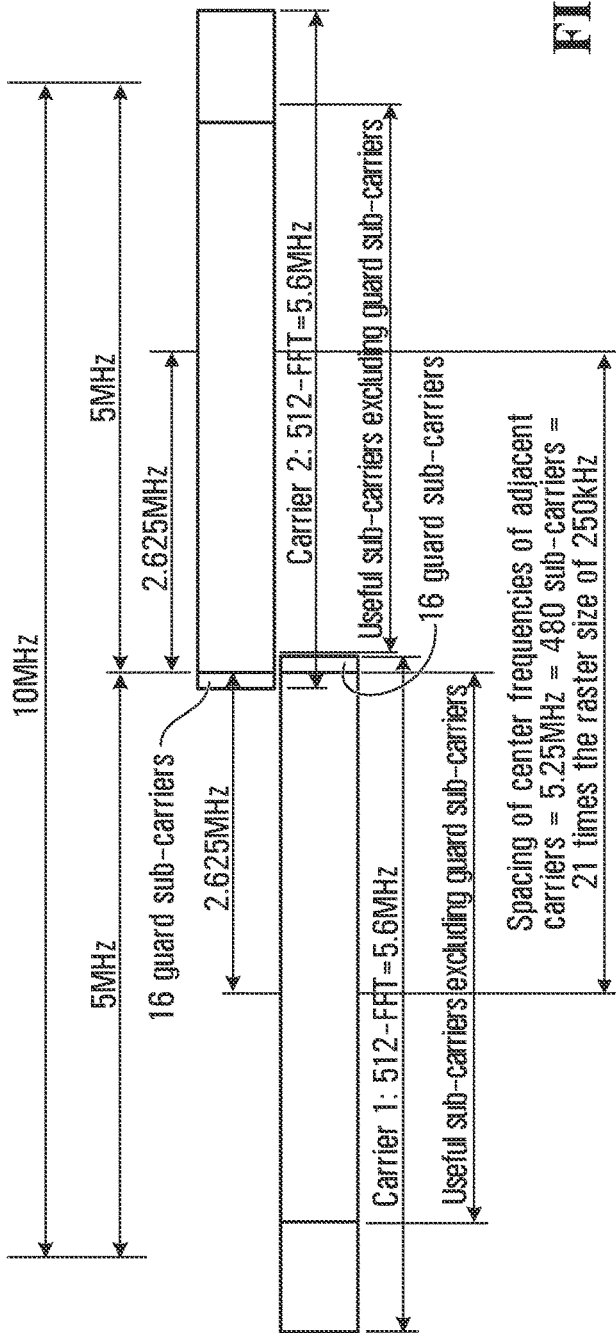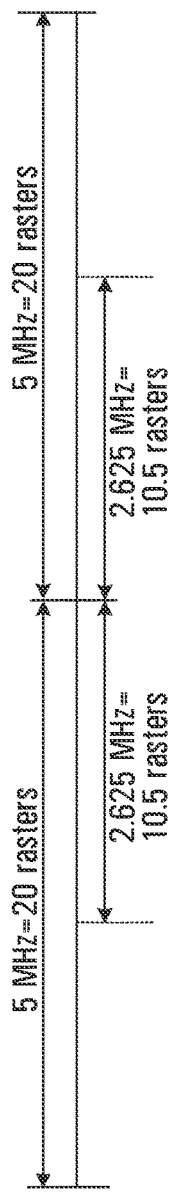
FIG. 12A
FIG. 12B

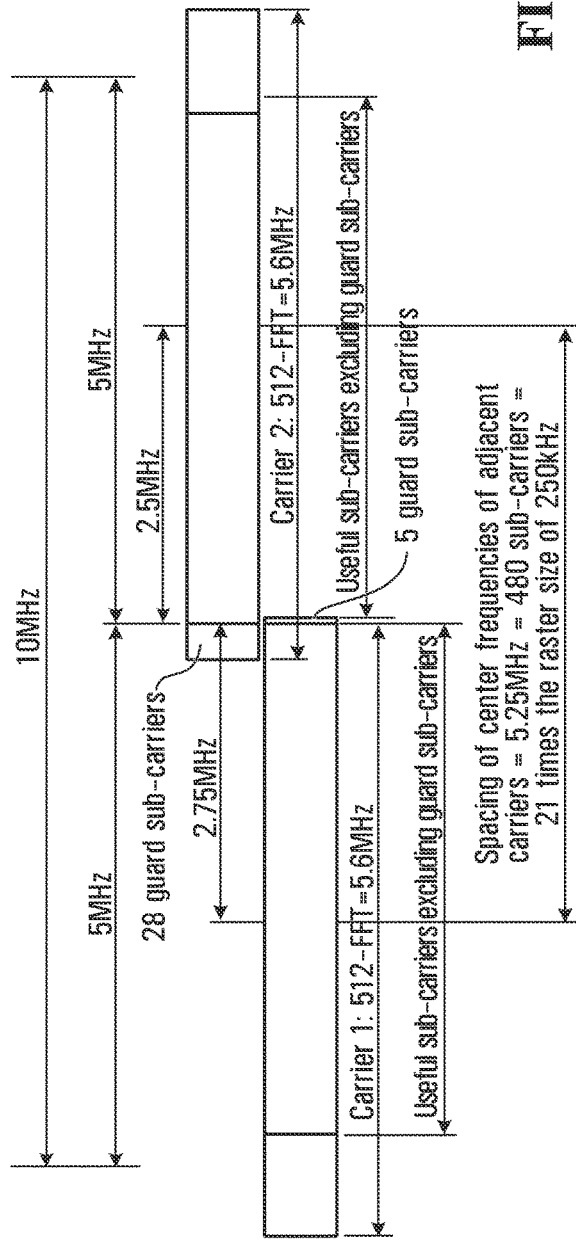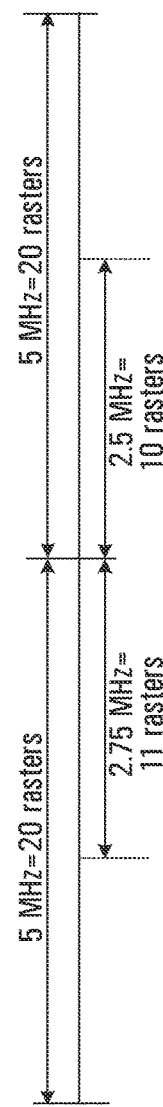
FIG. 13A
FIG. 13B

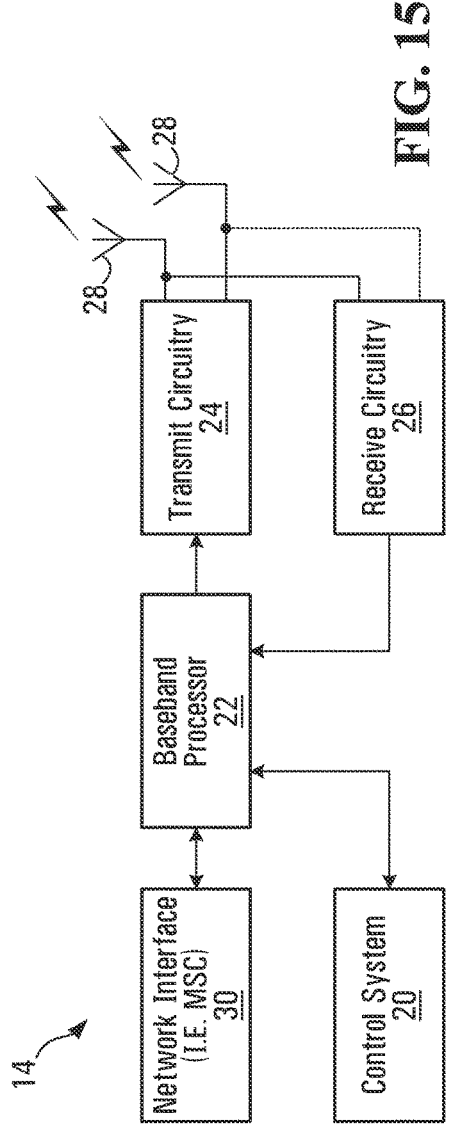
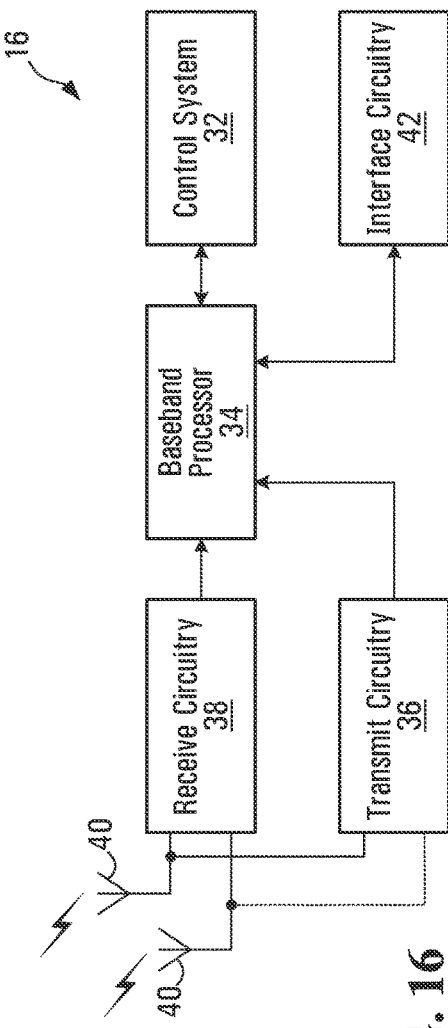
FIG. 15
FIG. 16

METHODS AND SYSTEMS FOR HARQ PROTOCOLS

RELATED APPLICATIONS

This application is a continuation of U.S. patent application Ser. No. 15/168,669, filed May 31, 2016, which is a continuation of U.S. patent application Ser. No. 14/918,934, filed Oct. 21, 2015, now U.S. Pat. No. 9,374,198, which is a continuation of U.S. patent application Ser. No. 14/500,468, filed Sep. 29, 2014, now U.S. Pat. No. 9,197,377, which is a continuation of U.S. patent application Ser. No. 14/012,166, filed Aug. 28, 2013, now U.S. Pat. No. 8,959,410, which is a continuation of U.S. patent application Ser. No. 12/988,717, filed Oct. 20, 2010, now U.S. Pat. No. 8,527,829, which claims the benefit of and is a National Phase Entry of International Application No. PCT/CA2009/000522, filed Apr. 21, 2009, which claims the benefit of U.S. Provisional Patent Application No. 61/046,625 filed on Apr. 21, 2008 and U.S. Provisional Patent Application No. 61/050,329 filed on May 5, 2008, which are hereby incorporated by reference in their entirety.

FIELD OF THE INVENTION

The invention relates to wireless communication systems.

BACKGROUND OF THE INVENTION

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network. The CDMA 2000 wireless access technology from 3GPP2 is also evolving. The evolution of CDMA 2000 is referred to as the Ultra Mobile Broadband (UMB) access technology, which supports significantly higher rates and reduced latencies.

Another type of wireless access technology is the WiMAX (Worldwide Interoperability for Microwave Access) technology. WiMAX is based on the IEEE (Institute of Electrical and Electronics Engineers) 802.16 Standard. The WiMAX wireless access technology is designed to provide wireless broadband access.

A few variations of hybrid automatic repeat request (HARQ) transmission/operation schemes exist in the above identified access technologies. One variation is unicast HARQ in which each encoded packet includes data from one user. This can be fully asynchronous in which case the modulation and coding scheme (MCS), transmission time (slot/frame) and resource allocation are independent for each transmission of an encoded packet (first and all re-transmissions). Assignment signaling is used to describe the resource allocation, MCS and user IDs for each transmission and re-transmission. While this approach allows adaptation to real time channel conditions, it incurs large signaling overhead. Unicast HARQ can alternatively be fully synchronous. In this case, the MCS scheme for transmissions (first and all retransmissions) is the same, resource allocation (location) remains the same for first and all retransmissions (the transmission location must be the same as the first transmission). The transmission interval is fixed, and assignment signaling is required only for the first transmission. This enables lower signaling overhead for retransmission, but can cause significant scheduling complexity and signaling overhead for the first transmission due to the irregular vacancies of resources that occurs since some resources need to be reserved for retransmissions that may not be necessary.

Another HARQ variant is multicast HARQ in which each encoded packet includes data for multiple users. The worst channel quality indicators (CQIs) among multiple users are considered for selecting MCS. The entire packet is retransmitted if one or more users could not decode it successfully, even though some of the users may have successfully decoded the packet. Multi-cast HARQ can be implemented using fully asynchronous and fully synchronous schemes.

SUMMARY OF THE INVENTION

According to a first aspect of the invention, there is provided a method comprising: for a HARQ process, the HARQ process comprising a first transmission of an encoder packet and at least one retransmission, in which a transmission resource for each respective transmission is allocated; transmitting control information from a base station to a mobile station for each respective transmission, the control information comprising: information to uniquely identify the HARQ process; and an identification of one of a time resource, a frequency resource and a time and frequency resource that is allocated for the transmission.

In some embodiments, transmitting information to uniquely identify the HARQ process includes transmitting one of: an encoder packet identifier (ID) to uniquely identify the encoder packet; and a resource identifier (ID) of a previous transmission.

In some embodiments, transmitting control information for the first transmission also comprises one or more of: a modulation and coding scheme (MCS) for the encoder packet; a MIMO mode used for transmitting the encoder packet; and one or more other pieces of control information relevant to the HARQ transmission of the encoder packet.

In some embodiments, transmitting control information further comprises: scrambling the control information using a user identifier (ID) associated with the mobile station.

In some embodiments, for allocating a transmission resource for at least one unicast Uplink (UL) transmission, transmitting control information comprises: transmitting a UL control segment that is a portion of a DL transmission resource, the UL control segment comprising a portion that identifies a location in the UL control segment for transmitting unicast control information for each at least one unicast UL transmission and a portion that defines the control information for use in transmitting the unicast UL transmission.

In some embodiments, for allocating a transmission resource for at least one unicast Downlink (DL) transmission, transmitting control information comprises: for each at least one unicast DL transmission, transmitting a DL unicast control and traffic segment comprising a portion of the DL unicast control and traffic segment that defines the control information for use in transmitting the unicast DL transmission and a portion of the DL unicast control and traffic segment for transmitting data for the respective unicast DL transmission.

According to a second aspect of the invention, there is provided a method for acknowledging a DL HARQ transmission comprising: receiving an encoder packet; if the encoder packet is successfully decoded, transmitting an acknowledgement (ACK); if the encoder packet is not successfully decoded, transmitting a negative acknowledgement (NAK); if no retransmission is received within a predetermined time period of transmitting the NAK, transmitting a NULL indicating that no control information signalling pertaining to the retransmission has been received.

According to a third aspect of the invention, there is provided a method for acknowledging a DL HARQ transmission comprising: if an acknowledgement (ACK) in response to a previously transmitted encoder packet has been received, not retransmitting an encoder packet; if a negative acknowledgement (NAK) in response to a previously transmitted encoder packet has been received, retransmitting a sub-packet of the encoder packet; if a NULL is received indicating that no control information signalling has been received by a sender of the NULL regarding a previously transmitted encoder packet, retransmitting at least a sub-packet of the encoder packet.

In some embodiments, retransmitting at least a sub-packet of the encoder packet if a NULL is received comprises: if the NULL is received in response to a previously transmitted sub-packet of an encoder packet that is a first sub-packet transmission, retransmitting the first sub-packet transmission, the first sub-packet transmission comprising control information signaling sent in a first sub-packet transmission; if the NULL is received in response to a previously transmitted sub-packet of an encoder packet that is a subsequent sub-packet transmission to a first sub-packet transmission, retransmitting the subsequent sub-packet transmission, the subsequent sub-packet transmission comprising control information signaling that comprises: information to uniquely identify the HARQ process; and an identification of one of a time resource, a frequency resource and a time and frequency resource that is allocated for the subsequent sub-packet transmission.

In some embodiments, retransmitting control information signalling to uniquely identify the HARQ process includes transmitting one of: an encoder packet identifier (ID) to uniquely identify the encoder packet; and a resource identifier (ID) of a previous transmission.

In some embodiments, retransmitting control information signaling sent in the first sub-packet transmission comprises: information to uniquely identify the HARQ process; an identification of one of a time resource, a frequency resource and a time and frequency resource that is allocated for the transmission; and one or more of: a modulation and coding scheme (MCS) for the encoder packet; a MIMO mode used for transmitting the encoder packet; and one or more other pieces of control information relevant to the HARQ transmission of the encoder packet.

According to a fourth aspect of the invention, there is provided a method for rescheduling a UL HARQ transmission comprising: if an encoder packet is not successfully decoded, scheduling an UL transmission of a sub-packet at a predetermined time interval; and transmitting control information pertaining to the UL transmission according to the first aspect of the invention described above.

According to a fifth aspect of the invention, there is provided a method of error recovery for a UL HARQ transmission comprising: if a NULL is received in response to a previously transmitted sub-packet of an encoder packet that is a first sub-packet transmission; dynamically scheduling a retransmission of the first sub-packet transmission at any time; retransmitting the first sub-packet transmission, the first sub-packet transmission comprising control information signaling sent in a first sub-packet transmission; if a NULL is received in response to a previously transmitted sub-packet of an encoder packet that is a subsequent sub-packet transmission to a first sub-packet transmission; scheduling a retransmission of the first sub-packet transmission at a predetermined time; retransmitting the subsequent sub-packet transmission, the subsequent sub-packet transmission comprising control signaling information that comprises: information to uniquely identify the HARQ process; and an identification of one of a time resource, a frequency resource and a time and frequency resource that is allocated for the subsequent sub-packet transmission.

According to a sixth aspect of the invention, there is provided a method comprising: in a system having a known HARQ acknowledgement (ACK) delay, retransmit delay and number of HARQ interlaces, which are each defined in configuration signalling sent to a mobile station and which are a function of at least one of a time division duplexing downlink/uplink (TDD DL/UL) ratio and a frequency division duplexing downlink/uplink (FDD DL/UL) ratio, at a base station, determining the timing for receiving an ACK/NAK from a mobile station based on configuration signalling in response to a previously sent transmission of an encoder packet by the base station; and at a mobile station, determining the timing for receiving one of a transmission and a retransmission of a sub-packet of an encoder packet from a base station based on the configuration signalling in response to a previously sent NAK by the mobile station.

In some embodiments, the HARQ acknowledgement (ACK) delay, retransmission delay and number of HARQ interlaces, which are each defined in configuration signalling sent to a mobile station are a function of portioning of legacy and non-legacy transmission resources.

In some embodiments, a non-legacy transmission resource is a transmission source supported by at least one of: IEEE802.16m, WiMAX evolution and LTE advanced.

In some embodiments, the ACK/NAK and the transmission and retransmissions can be transmitted on one of: a time resource, a frequency resource, and a time and frequency resource.

In some embodiments, if the TDD DL/UL ratio of sub-frames of a frame are asymmetric; the UL ACKs for corresponding DL transmissions, in which the DL transmissions occur in more DL sub-frames of the frame than UL sub-frames that are available for the UL ACKs, transmitting a plurality of UL ACKs in one UL sub-frame; the DL ACKs for corresponding UL transmissions, in which the UL transmissions occur in more UL sub-frames of the frame than DL sub-frames that are available for the DL ACKs, transmitting a plurality of DL ACKs in one DL sub-frame.

In some embodiments, if the FDD DL/UL ratio of sub-frames of a frame are asymmetric; the UL ACKs for corresponding DL transmissions, in which the DL transmissions occur in more DL sub-frames of the frame than UL sub-frames that are available for the UL ACKs, transmitting a plurality of UL ACKs in one UL sub-frame; the DL ACKs for corresponding UL transmissions, in which the UL transmissions occur in more UL sub-frames of the frame than DL sub-frames that are available for the DL ACKs, transmitting a plurality of DL ACKs in one DL sub-frame.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIGS. 12A and 12B are schematic diagrams of an example of two adjacent carriers in which both carriers support non-legacy transmissions according to an embodiment of the invention;

FIGS. 13A and 13B are schematic diagrams of an example of two adjacent carriers in which both carriers support non-legacy transmissions according to another embodiment of the invention;

FIG. 15 is a block diagram of an example base station that might be used to implement some embodiments of the present invention;

FIG. 16 is a block diagram of an example wireless terminal that might be used to implement some embodiments of the present invention;

DETAILED DESCRIPTION OF THE EMBODIMENTS OF THE INVENTION

Figure 1:
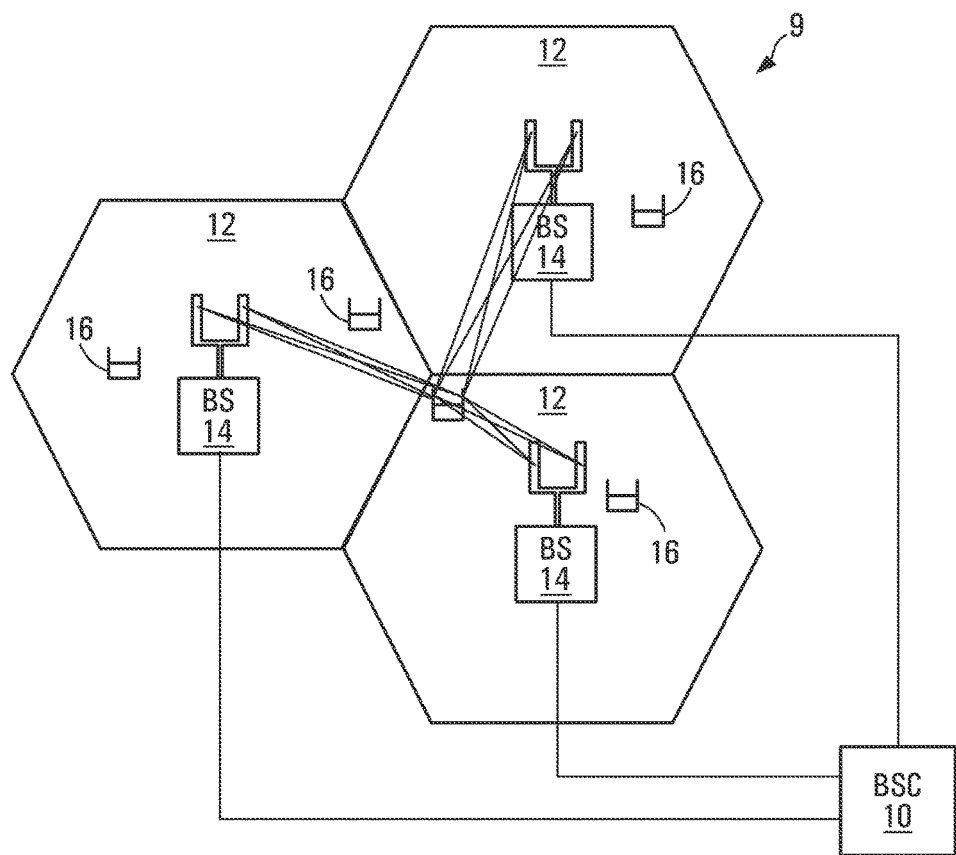
FIG. 1 is a block diagram of a cellular communication system on which embodiments of the invention may be implemented.

For the purpose of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The mobile terminals 16 may be referred to as users or UE in the description that follows. The individual cells may have multiple sectors (not shown). The movement of the mobile terminals 16 in relation to the base stations 14 results in significant fluctuation in channel conditions. As illustrated, the base stations 14 and mobile terminals 16 may include multiple antennas to provide spatial diversity for communications.

Methods of transmission described herein may be performed for one or both of uplink (UL) and downlink (DL). UL is transmitting in a direction from a mobile station to a base station. DL is transmitting in a direction from the base station to the mobile station.

HARQ Protocol and Timing for Wireless Systems

The TGm SRD (IEEE 802.16m-07/002r4) specifies the following requirements:

in section 6.2.1 pertaining to Data latency, Table 3 defines a maximum allowable latency for DL and UL of 10 ms; and in section 6.10 pertaining to System overhead it is defined that "Overhead, including overhead for control signaling as well as overhead related to bearer data transfer, for all applications shall be reduced as far as feasible without compromising overall performance and ensuring proper support of systems features".

Aspects of the invention provide a HARQ scheme to address aspects of the above requirements. However, while aspects of the invention may be described in regard to IEEE802.16m, it is to be understood that embodiments of the invention are not limited to IEEE802.16m. Some embodiments of the invention may be applied to other communication standards as well, such as, but not limited to WiMAX evolution and LTE advanced.

Described herein are embodiments for use with HARQ schemes. Some embodiments of the invention involve a resource adaptive HARQ (RAS-HARQ) scheme, in particular control signaling for the RAS-HARQ scheme. RAS-HARQ provides a trade-off between signaling overhead and flexibility in resource multiplexing among users. In some embodiments of the invention, specific control information is signalled from a base station to a mobile station to enable RAS-HARQ operation.

In some embodiments of the invention, retransmission signaling in included as part of regular unicast signaling used for both first transmission and retransmissions.

Synchronous HARQ has the benefit of minimum signaling overhead as retransmission does not need to be signaled, but the drawback of Inflexible resource allocation and multiplexing. If the mobile station misses the control signaling of first sub-packet and base station does not recognize that, it is not possible to recover the packet. In case of ACK to NAK error in the DL for UL transmission, mobile station's retransmission may collide with other mobile stations.

Asynchronous HARQ has the benefit of being flexible in terms of prioritization new transmission vs. retransmission. Therefore, it provides better link adaptation/time diversity performance for very low speed cases. If the mobile station misses the control signaling of the first or any other sub-packet, there is still possibility to recover the packet. However, it has the drawback of requiring more signaling overhead compared to other schemes in order to indicate such parameters as HARQ channel identifiers (ACID), sub-packet identifiers (ID), HARQ identifier sequence number (AI-SN).

RAS-HARQ has the benefit of relatively small signaling overhead compared to the asynchronous HARQ and flexible resource allocation and multiplexing among users. However, it has the drawback of if the mobile station misses the control signaling of first transmission and the base station does not recognize that, it is not possible to recover the packet.

There are several ways to perform retransmission in terms of the retransmission time interval, the resource location for the retransmission and the MCS used for the retransmission. Table 1 briefly summarizes characteristics of retransmission for Synchronous HARQ, Asynchronous HARQ and RAS-HARQ.

TABLE 1

Characteristics of retransmission for synchronous HARQ, Asynchronous HARQ and Resource Adaptive Synchronous HARQ

|  | Synchronous HARQ | Asynchronous HARQ | RAS-HARQ |
| --- | --- | --- | --- |
| Retransmission time interval | Fixed/ predetermined | Variable, dynamically scheduled | Fixed/predetermined |
| Resource location | Same as first sub-packet transmission | Variable, dynamically assigned | Variable, dynamically assigned |
| MCS | Same for Chase, different for IR | Same for Chase, different for IR | Same for Chase, different for IR |

Error in control signaling impacts HARQ performance since control information sent from the base station to the mobile station contains critical information for HARQ sub-packet combining. Two of the common techniques of recombining sub-packets include Chase combining and Incremental Redundancy (IR). In the case of Chase combining, each retransmission includes the same information. In the case of IR, each retransmission contains different information than the previous one, such that every retransmission provides a receiver with additional information.

IR provides both soft combining gain as well as coding gain. In some embodiments of the invention additional signaling overhead typically occurring when IR is used is avoided by defining a sub-packet format lookup table. For each MCS entry, the sub-packet format, i.e. modulation and effective coding rate derived from a mother code, is specified for each retransmission trial. Some entries in the lookup table can be effectively reduced to Chase combining when two consecutive retransmission trials have the same sub-packet format.

In some embodiments of the invention, a 3-state acknowledgement channel and associated error recovery operation enables the base station and mobile station to recover from control signaling error and reduce packet loss.

While Asynchronous HARQ typically requires more signaling overhead than other types of HARQ schemes, it allows more resource multiplexing flexibility at the base station. Asynchronous HARQ also allows the base station to perform error recovery processes when needed. In some embodiments of the invention, RAS-HARQ may be used in combination with asynchronous HARQ.

HARQ acknowledgment and retransmission timing is at least in part dependent on processing delay at the base station and at the mobile station. Time division duplex (TDD) downlink (DL) to uplink (UL) ratios and the location of DL sub-frames and UL sub-frames being assigned for transmission also affect the HARQ timing as the TDD DL to UL ratios impact when the DL and UL resources are available for retransmission and acknowledgement. In some embodiments of the invention, methods are provided that enable self deducible HARQ timing at the mobile station based on the use of HARQ related parameters configured by the base station.

In RAS-HARQ, only the resource location needs to be signalled for retransmissions. In some embodiments, there are multiple parallel HARQ processes in progress for the same mobile station, where each HARQ process corresponds to a first transmission and any retransmissions that are necessitated of an encoder packet. Therefore, retransmission signaling according to RAS-HARQ involves uniquely identifying a HARQ process as well as a resource assigned for the retransmission.

A first manner of signaling a retransmission involves transmitting signalling information that includes an encoder packet ID to uniquely identify the encoder packet, and consequently the HARQ process, and resource assignment information for the retransmission. In some embodiments the signaling information is scrambled as a function of a user ID of the mobile station involved in the retransmission.

In some embodiments, with regard to a packet that is being subsequently retransmitted consistent with the first manner described above, signaling information for the initial transmission of that packet includes a packet ID and resource assignment information for the initial transmission. In some embodiments a user ID is also used for scrambling. In addition, other signalling information that is transmitted for the initial transmission may include one or more of: the MCS; MIMO mode; and other characteristics that define the packet transmission.

A second manner of signaling a retransmission involves transmitting signalling information that includes a resource ID of a previous retransmission and resource assignment information for the retransmission. The use of the resource ID of the previous retransmission can uniquely identify the HARQ process since each HARQ process is assigned a different resource in the previous retransmission. In some embodiments the signaling information is scrambled as a function of a user ID of the mobile station involved in the retransmission.

In some embodiments, with regard to a packet that is being subsequently retransmitted consistent with the second manner described above, signaling information for the initial transmission of that packet includes a resource ID of the previous retransmission and resource assignment information for the initial transmission. In some embodiments a user ID is also used for scrambling. In addition, other signaling information that is transmitted for the initial transmission may include one or more of: the MCS; MIMO mode; and other characteristics that define the packet transmission.

Figure 19:
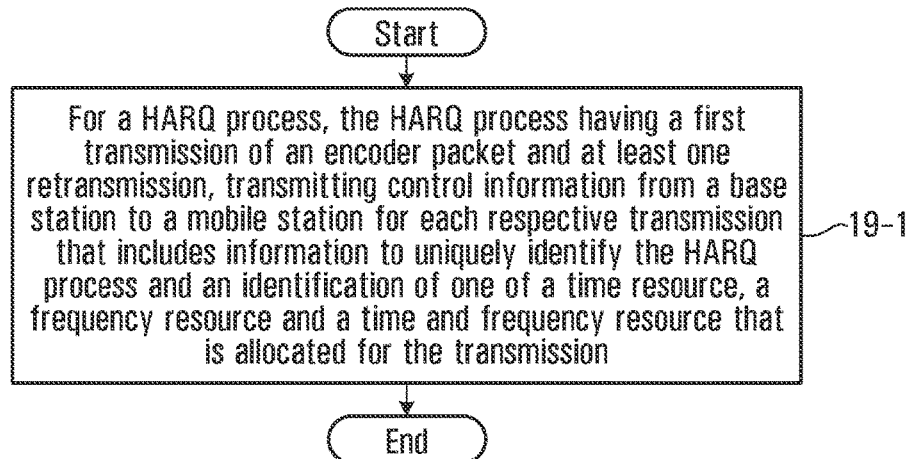
FIG. 19 is a flow chart of an example method according to an embodiment of the invention.

With reference to FIG. 19, a method will now be described that encompasses both the first and second manner described above. The method involves, for a HARQ process, the HARQ process having a first transmission of an encoder packet and at least one retransmission, a step 19-1 of transmitting control information from a base station to a mobile station for each respective transmission. The control information includes information to uniquely identify the HARQ process and an identification of one of a time resource, a frequency resource and a time and frequency resource that is allocated for the transmission.

In some embodiments, the step of transmitting information to uniquely identify the HARQ process includes transmitting one of: an encoder packet identifier (ID) to uniquely identify the encoder packet; and a resource identifier (ID) of a previous transmission.

Some examples of sub-frame control structures are presented in PCT patent application PCT/2008/001986 filed Nov. 7, 2008 and U.S. patent application Ser. No. 12/202,741 filed Sep. 2, 2008, both of which are assigned to the assignee of the present application, and are hereby incorporated by reference in their entirety.

Figure 2:
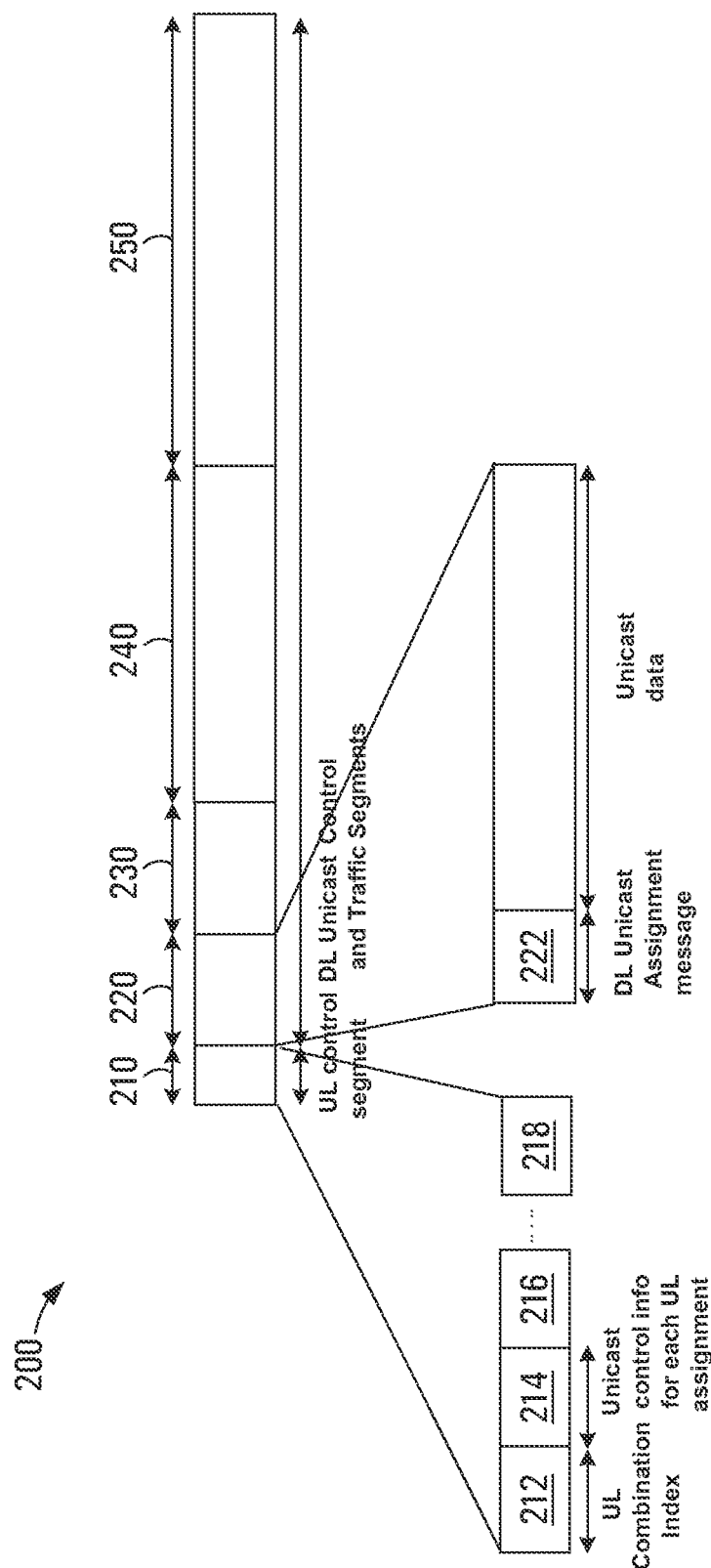
FIG. 2 is a schematic diagram of a transmission resource used for sub-frame control signaling according to an embodiment of the invention.

An example of RAS-HARQ will now be described with reference to FIG. 2. FIG. 2 illustrates at least part of a time resource, frequency resource, or time-frequency resource 200, used as a DL resource which is partitioned into multiple time-frequency segments 210,220,230,240,250. Segment 210 is a UL Control Segment (UCS) used for assigning resources for UL traffic. Each of segments 220,230,240,250 are DL Unicast Control and Traffic Segments used for assigning a particular DL unicast resource and the resources used for the DL traffic for a respective mobile station.

An expanded view of segment 210 includes a portion of segment 210 for a UL Combination Index 212 and multiple portions 214,216,218 of the segment 212 for unicast control information for each UL resource assignment. In some embodiments, the unicast control information includes retransmission control information that is used for signaling a retransmission in accordance with the first manner of signaling described above. In some embodiments, the unicast control information includes retransmission control information that is used for signaling a retransmission in accordance with the second manner of signaling described above.

An expanded view of segment 220 includes a portion of segment 220 for a DL Unicast Assignment Message 222 and a portion 224 of the segment 222 for the unicast transmission. In some embodiments, the DL Unicast Assignment Message 222 includes retransmission control information that is used for signaling a retransmission in accordance with the first manner of signaling described above. In some embodiments, the DL Unicast Assignment Message 222 includes retransmission control information that is used for signaling a retransmission in accordance with the second manner of signaling described above.

DL Unicast Control and Traffic Segments 230, 240 and 250 include similar portions as segment 220 described above for different DL unicast assignments.

Referring to the general method described above in FIG. 19, in some embodiments, allocating a transmission resource for at least one unicast Uplink (UL) transmission, transmitting control information includes a step of transmitting a UL control segment that is a portion of a DL transmission resource, the UL control segment comprising a portion that identifies a location in the UL control segment for transmitting unicast control information for each at least one unicast UL transmission and a portion that defines the control information for use in transmitting the unicast UL transmission.

Referring to the general method described above in FIG. 19, in some embodiments, allocating a transmission resource for at least one unicast Downlink (DL) transmission, transmitting control information comprises: for each at least one unicast DL transmission, transmitting a DL unicast control and traffic segment comprising a portion of the DL unicast control and traffic segment that defines the control information for use in transmitting the unicast DL transmission and a portion of the DL unicast control and traffic segment for transmitting data for the respective unicast DL transmission.

In some embodiments of the invention, a 3-state ACK channel (ACKCH) is used as part of the RAS-HARQ scheme. A first state used on the channel is an "ACK", which indicates correct reception of a packet. A second state is a "NAK", which is used to indicate failure in reception of a packet. A third state is a "NULL", in which no signal is transmitted by a mobile station on the ACKCH. A NULL occurs when the mobile station fails to detect the control signalling information corresponding to a sub-packet transmission.

The following example describes an implementation of the 3-state ACKCH operating from the perspective of a mobile station for DL.

The mobile station sends an ACK to the base station when the mobile station succeeds in decoding a received packet.

The mobile station sends a NAK to the base station when the mobile station fails to decode a received packet. After sending a NAK, the mobile station waits for a retransmission from the base station. If the mobile station does not receive any retransmission signaling within a predetermined time interval, the mobile station sends a NULL indicating that no retransmission signal was received.

There are different possibilities why the mobile station may not have received any retransmission signaling. A first possibility is that the mobile station failed to detect the retransmission signalling from the base station. This may be overcome by the base station detecting the NULL from the mobile station and the base station retransmitting the retransmission signaling. A second possibility is that the base station did not send a retransmission due to a NAK-to-ACK detection error at the base station. This may occur when the base station incorrectly detects an ACK when a NAK was sent by the mobile station. In this case, a packet failure will likely occur.

In some implementations, the mobile station retains the HARQ buffer corresponding to an encoder packet until the expiry of a configurable timeout period.

The following describes an implementation of the 3-state ACKCH operating from the perspective of a base station for DL.

When the base station receives an ACK from a mobile station, the base station does not perform retransmission to the mobile station. In some implementations, as discussed above, this may result in no retransmission being sent when the base station incorrectly detects an ACK, when a NAK was sent by the mobile station.

When the base station receives a NAK from the mobile station, the base station retransmits a sub-packet to the mobile station at a predetermined time interval. A new resource assignment and encoded packet ID, and possible a user ID is signaled as described above.

When the base station receives a NULL from a mobile station, the base station will interpret that the mobile station has lost the signaling associated with a sub-packet transmission.

If the transmission that was sent was a first sub-packet transmission, the base station will retransmit the first sub-packet in conjunction with the full signaling information, i.e. MCS, resource location, user ID, MIMO information, packet ID etc. The base station can dynamically schedule the retransmission of this first sub-packet at any time.

If the transmission that was sent was a second or subsequent sub-packet transmission, the base station will retransmit at a predetermined time interval the corresponding sub-packet. In some embodiments, for the first manner of retransmitting signaling described above, the base station sends the encoded packet ID, resource location information for the current retransmission sub-packet and user ID. In some embodiments, for the second manner of retransmitting signaling described above, the base station sends the original resource location of the first sub-packet, resource location information of the current retransmission sub-packet, and the user ID (for scrambling).

Figure 20:
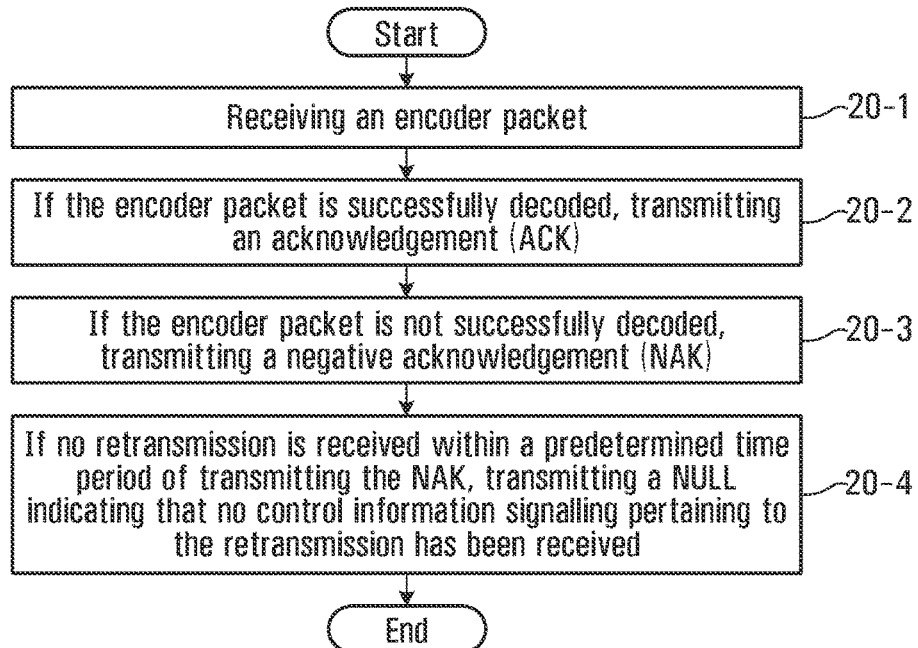
FIG. 20 is a flow chart of an example method according to another embodiment of the invention.

Referring to FIG. 20, a method will now be described for acknowledging a DL HARQ transmission. A first step 20-1 of the method involves receiving an encoder packet. A second step 20-2 involves, if the encoder packet is successfully decoded, transmitting an acknowledgement (ACK). A third step 20-3 involves, if the encoder packet is not successfully decoded, transmitting a negative acknowledgement (NAK). A fourth step 20-4 involves, if no retransmission is received within a predetermined time period of transmitting the NAK, transmitting a NULL indicating that no control information signalling pertaining to the retransmission has been received.

The following describes an implementation of the 3-state ACKCH operating from the perspective of a base station for UL.

When the base station fails to receive a packet, it schedules an UL retransmission of the sub-packet at the predetermined time interval. In scheduling the UL retransmission the base station sends a new resource assignment, a HARQ process identification or an encoded packet identification and user ID to the mobile station.

When the base station succeeds in decoding a packet, no retransmission is scheduled.

In some embodiments, the base station performs an error recovery procedure for the case when the mobile station fails to decode the first sub-packet transmission signaling or the subsequent retransmission signalling. An example of an error recovery procedure is described below.

For the case of first sub-packet transmission signaling, if the base station fails to detect any UL transmission from the mobile station at the assigned resource, the base station can resend the full signaling information, i.e. MCS, resource location, user ID (scrambled), MIMO information etc. In some embodiments the base station dynamically schedules the retransmission of this first sub-packet at any time.

For the case of retransmission signaling, i.e. second or subsequent sub-packet retransmissions, if the base station fails to detect any UL transmission from the mobile station at the assigned resource, the base station can send at the predetermined time interval a reduced amount of signaling information, in comparison to the signalling information sent for the first transmission. For the first manner of retransmission signaling described above, the base station sends the encoded packet ID, resource assignment for the current retransmission sub-packet and user ID. For the second manner of retransmission signaling described above, the base station sends the original resource assignment of the first sub-packet, resource assignment of the next retransmission sub-packet and user ID.

Figure 21:
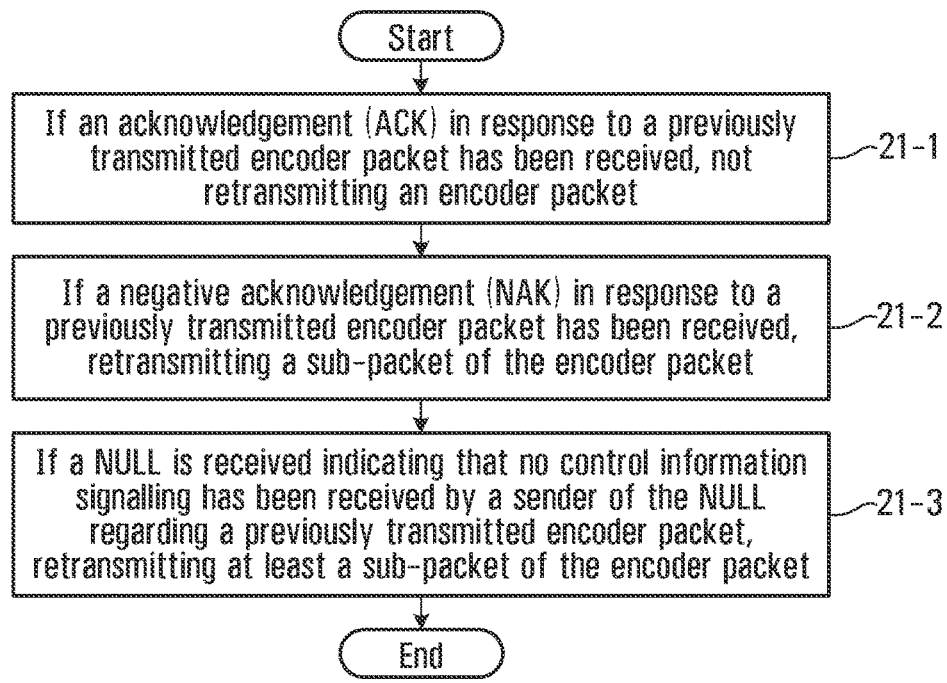
FIG. 21 is a flow chart of an example method according to yet another embodiment of the invention.

Referring to FIG. 21, a method will now be described for acknowledging a DL HARQ transmission. A first step 21-1 of the method involves, if an acknowledgement (ACK) in response to a previously transmitted encoder packet has been received, not retransmitting an encoder packet. A second step 21-2 of the method involves, if a negative acknowledgement (NAK) in response to a previously transmitted encoder packet has been received, retransmitting a sub-packet of the encoder packet. A third step 21-3 of the method involves, if a NULL is received indicating that no control information signalling has been received by a sender of the NULL regarding a previously transmitted encoder packet, retransmitting at least a sub-packet of the encoder packet.

In some embodiments, if the NULL is received in response to a previously transmitted sub-packet of an encoder packet that is a first sub-packet transmission, retransmitting the first sub-packet transmission, the first sub-packet transmission comprising control information signaling sent in a first sub-packet transmission.

In some embodiments, if the NULL is received in response to a previously transmitted sub-packet of an encoder packet that is a subsequent sub-packet transmission to a first sub-packet transmission, retransmitting the subsequent sub-packet transmission. The subsequent sub-packet transmission may include control information signaling such as information to uniquely identify the HARQ process and an identification of one of a time resource, a frequency resource and a time and frequency resource that is allocated for the subsequent sub-packet transmission.

Figure 22:
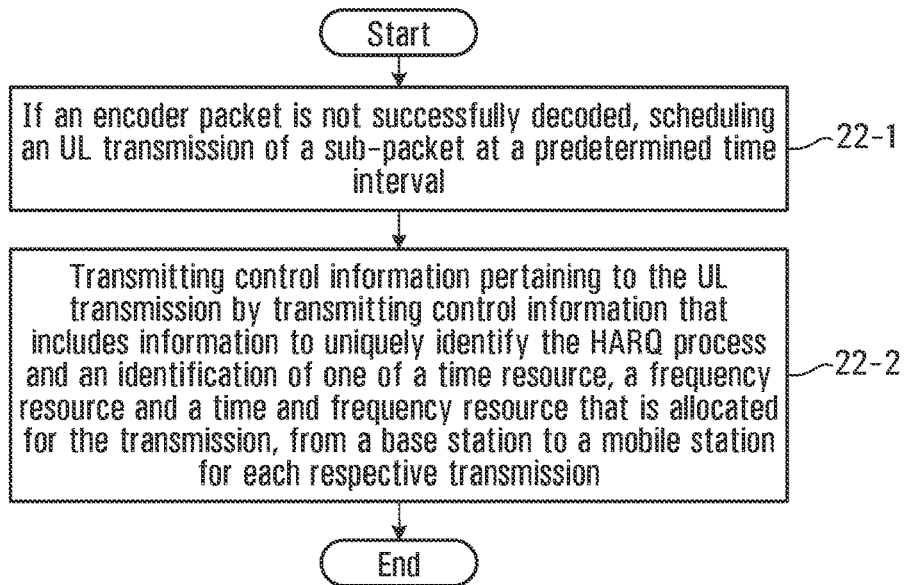
FIG. 22 is a flow chart of an example method according to a further embodiment of the invention.

Referring to FIG. 22, a method will now be described for rescheduling a UL HARQ transmission. A first step 22-1 of the method involves, if an encoder packet is not successfully decoded, scheduling an UL transmission of a sub-packet at a predetermined time interval. A second step 22-2 involves transmitting control information pertaining to the UL transmission according to the method described above with regard to FIG. 19.

Figure 23:
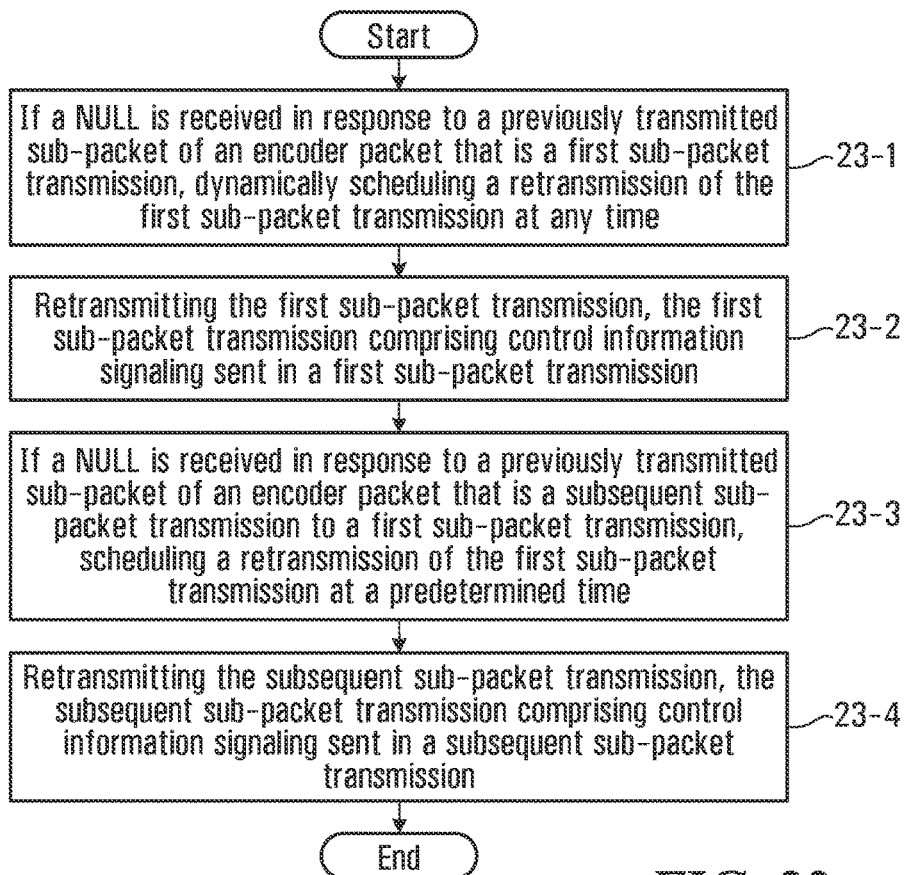
FIG. 23 is a flow chart of an example method according to another embodiment of the invention.

Referring to FIG. 23, a method will now be described for error recovery for a UL HARQ transmission. A first step 23-1 of the method involves, if a NULL is received in response to a previously transmitted sub-packet of an encoder packet that is a first sub-packet transmission, dynamically scheduling a retransmission of the first sub-packet transmission at any time. A second step 23-2 involves retransmitting the first sub-packet transmission, the first sub-packet transmission comprising control information signaling sent in a first sub-packet transmission.

A third step 23-3 involves, if a NULL is received in response to a previously transmitted sub-packet of an encoder packet that is a subsequent sub-packet transmission to a first sub-packet transmission, scheduling a retransmission of the first sub-packet transmission at a predetermined time. A fourth step 23-4 involves, retransmitting the subsequent sub-packet transmission. The subsequent sub-packet transmission includes control signaling information that includes information to uniquely identify the HARQ process and an identification of one of a time resource, a frequency resource and a time and frequency resource that is allocated for the subsequent sub-packet transmission.

The following describes an implementation of the 3-state ACKCH operating from the perspective of a mobile station for UL.

When the mobile station receives the retransmission signaling from the base station, the mobile station transmits the corresponding sub-packet in the assigned resource.

In some implementations, the mobile station retains the HARQ buffer corresponding to an encoded packet until the expiry of a configurable timeout period.

Deducible DL HARQ Timing

The HARQ protocol timing should be flexible to adapt to different TDD DL/UL ratio and non-legacy (one example of which is IEEE802.16m)/legacy partitioning, without incurring unnecessary overhead. The minimum HARQ ACK delay and Retransmit (Retrx) delay and the number of HARQ channels/interlaces are defined in system/mobile station configuration signaling which corresponds to particular partitioning of resources used in legacy and non-legacy systems, and TDD DL/UL ratios. With these parameters defined, the precise HARQ timing for ACK/NAK transmission and retransmission can be deduced as will be described below with reference to FIGS. 3A to 3E. This concept can be applied to both TDD and frequency division duplexing (FDD).

In some embodiments, due to the asymmetrical DL/UL TDD (or FDD) ratio, the UL ACK of DL HARQ for multiple DL sub-frames may coincide in one UL sub-frame as shown in FIGS. 3A to 3E. The location of the ACKCH of a mobile station within the UL sub-frame can be deduced from the HARQ interlace number, the assigned DL resource of the previous HARQ sub-packet transmission, and the number of UL ACKCHs allocated per DL sub-frames as signaled in a superframe header. In some embodiments, a similar approach is used for the case of DL acknowledgement of UL HARQ as shown in FIGS. 4A to 4C.

Several examples will now be described to illustrate different implementations based on different TDD DL/UL ratios, ACK delay, retransmit delay and HARQ interlaces.

Figure 3A:
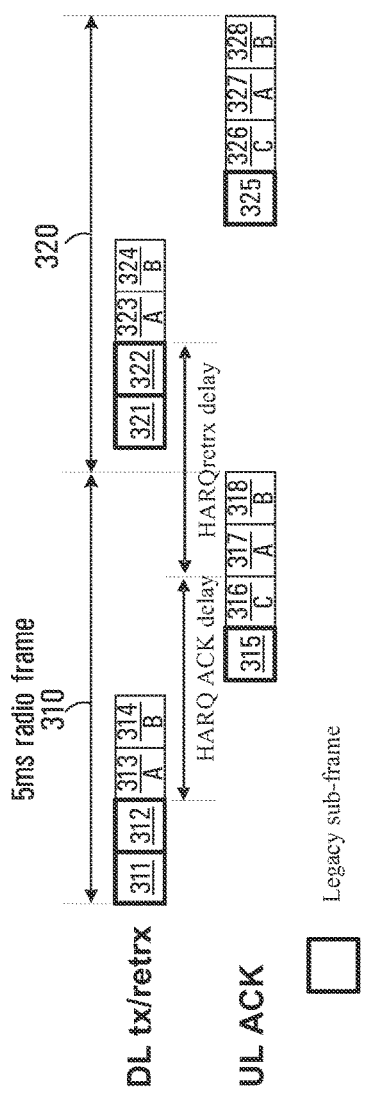
FIGS. 3A to 3E are example schematic diagrams of radio frame having downlink (DL) and uplink (UL) portions for DL transmissions and UL acknowledgements for a HARQ scheme according to an embodiment of the invention.
Figure 4A:
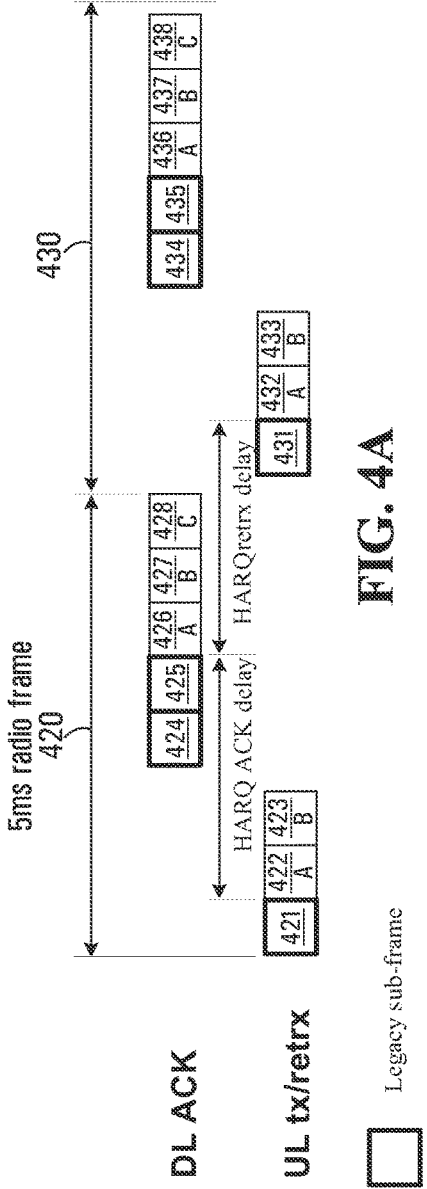
FIGS. 4A to 4C are example schematic diagrams of radio frame having downlink (DL) and uplink (UL) portions for UL transmissions and DL acknowledgements for a HARQ scheme according to an embodiment of the invention.
Figure 4B:
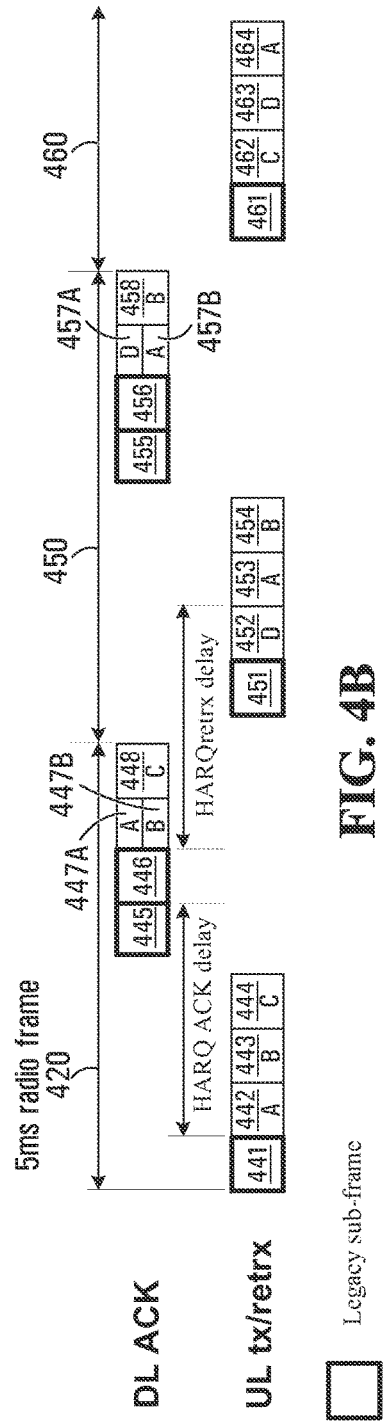
Figure 4C:
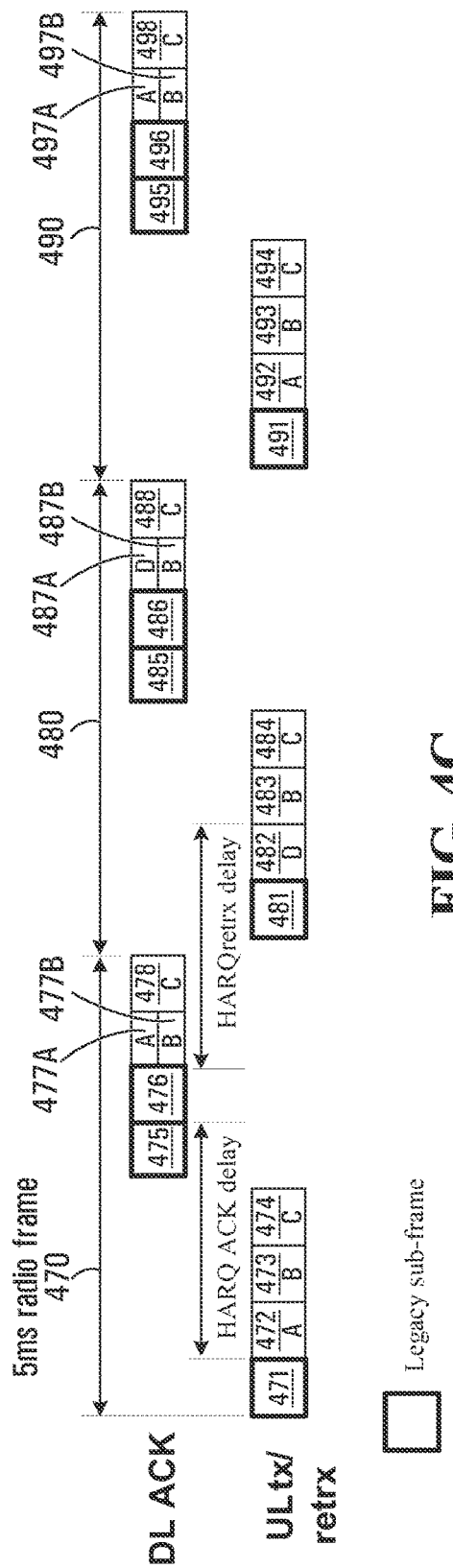

FIG. 3A illustrates two successive 5 ms radio frames 310,320 that each include 8 sub-frames. Four sub-frames 311,312,313,314 are a portion of the first radio frame 310 used for DL transmission and retransmission. Sub-frames 311 and 312 are for use with legacy equipment and sub-frames 313 and 314 are for use with equipment that supports IEEE802.16m. Four sub-frames 321,322,323,324 are a portion of a subsequent 5 ms radio frame 320 used for DL transmission and retransmission. Sub-frames 321 and 322 are for use with legacy equipment and sub-frames 323 and 324 are for use with equipment supports IEEE802.16m. Sub-frames 313 and 323 are a first HARQ interlace "A" and sub-frames 314 and 324 are a second HARQ interlace "B".

Four sub-frames 315,316,317,318 are a portion of the first 5 ms radio frame 310 used for UL acknowledgement (ACK). Sub-frame 315 is for use with legacy equipment and sub-frames 316, 317 and 318 are for use with equipment that supports IEEE802.16m. Four sub-frames 325,326,327,328 are a portion of the subsequent radio frame 320 used for UL ACK. Sub-frame 325 is for use with legacy equipment and sub-frames 326, 327 and 328 are for use with equipment that supports IEEE802.16m.

As there are two sub-frames allocated for IEEE802.16m DL transmission and retransmission and three sub-frames allocated for UL ACKs, the TDD DL/UL ratio is 2:3.

The ACK delay, which is a delay between a transmission or retransmission at the base station and an ACK being transmitted by the mobile station, is illustrated to be four sub-frames in the example of FIG. 3A. The Retransmit delay, which is a delay between the ACK being transmitted at the mobile station and the retransmission being transmitted by the base station, is illustrated to be four sub-frames in the example of FIG. 3A.

FIG. 3A is an example having a particular set of parameters, i.e. TDD DL/UL ratio, ACK delay, Retransmit delay and HARQ interlace, 5 ms radio frame and 8 sub-frames per radio frame. It is to be understood that more generally these parameters are implementation specific and are not intended to limit the invention to a specific embodiment. Additional examples that follow below illustrate the use of different values for some of the parameters. Furthermore, while only two radio frames are illustrated in FIG. 3A, the figure is exemplary of operation of the timing scheme and as such the illustration of only two frames is not intend to limit the invention to what is described with reference to only this particular example. In addition, the sub-frames are described as supporting legacy and IEEE802.16m specifically, but it is to be understood that more generally the sub-frames may support legacy and non-legacy transmissions.

Figure 3B:
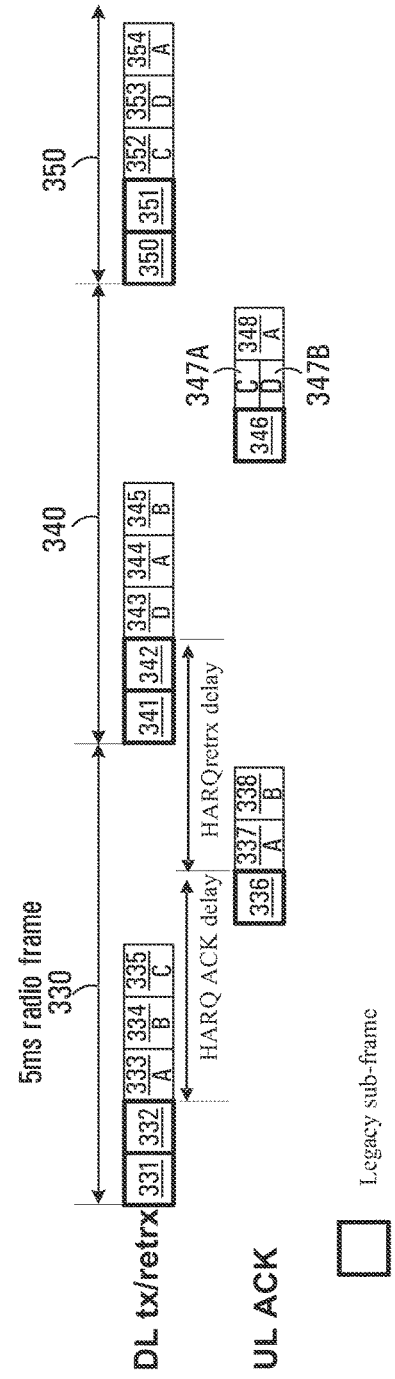

FIG. 3B illustrates two successive 5 ms radio frames 330,340 and a DL transmission portion of a third radio frame 350 in which in each frame, five sub-frames are used for DL transmission and retransmission and three sub-frames are used for UL ACK. DL transmission sub-frames 331 and 332 of the first frame 330 are for use with legacy equipment and DL transmission sub-frames 333, 334 and 335 of the first frame 330 are for use with equipment that supports IEEE802.16m. DL transmission sub-frames 341 and 342 of the second frame 340 are for use with legacy equipment and DL transmission sub-frames 343, 344 and 345 of the second frame 340 are for use with equipment that supports IEEE802.16m. DL transmission sub-frames 351 and 352 of the third frame 350 are for use with legacy equipment and DL transmission sub-frames 353, 354 and 355 of the third frame 350 are for use with equipment that is compliant with IEEE802.16m.

UL transmission sub-frame 336 of the first frame 330 is for use with legacy equipment and UL transmission sub-frames 337 and 338 of the first frame 330 are for use with equipment that supports IEEE802.16m. UL transmission sub-frame 346 of the second frame 340 is for use with legacy equipment and UL transmission sub-frames 347, including sub-divided portions 347A and 347B, and 348 of the second frame 340 are for use with equipment that is compliant with IEEE802.16m.

As there are three sub-frames allocated for IEEE802.16m DL transmission and retransmission and two sub-frames allocated for UL ACKs, the TDD DL/UL ratio is 3:2.

In FIG. 3B there are 4 HARQ interlaces, sub-frames 333, 344 and 354 is a first interlace "A", sub-frames 334 and 345 are a second interlace "B", sub-frames 335 and 352 are a third interlace "C" and sub-frames 343 and 353 are a fourth interlace "D".

The ACK delay and the Retransmit delay are each illustrated to be four sub-frames in the example of FIG. 3B.

In FIG. 3B, the sub-frame location within the radio frames for ACK and retransmission of a HARQ interlace change over time to accommodate the minimum ACK delay and Retransmit delay and retain the same ordering of the HARQ interlaces. For example, the ordering of the retransmissions in the allocated sub-frames is maintained in the pattern "ABCD" as can be seen from A(sub-frame 333), B(sub-frame 334), C(sub-frame 335), D(sub-frame 343), A(sub-frame 344), B(sub-frame 345), C(sub-frame 352), D(sub-frame 353), A(sub-frame 355). The ordering of the ACKs in the allocated sub-frames is similarly maintained as "ABCD" as A(sub-frame 337), B(sub-frame 338), C(sub-frame 347A), D(sub-frame 347B), A(sub-frame 348). As can be seen in FIG. 3B, the UL ACK in 347A and 347B for interlaces C and D, respectively, share a single sub-frame.

Figures 3C, 3D:
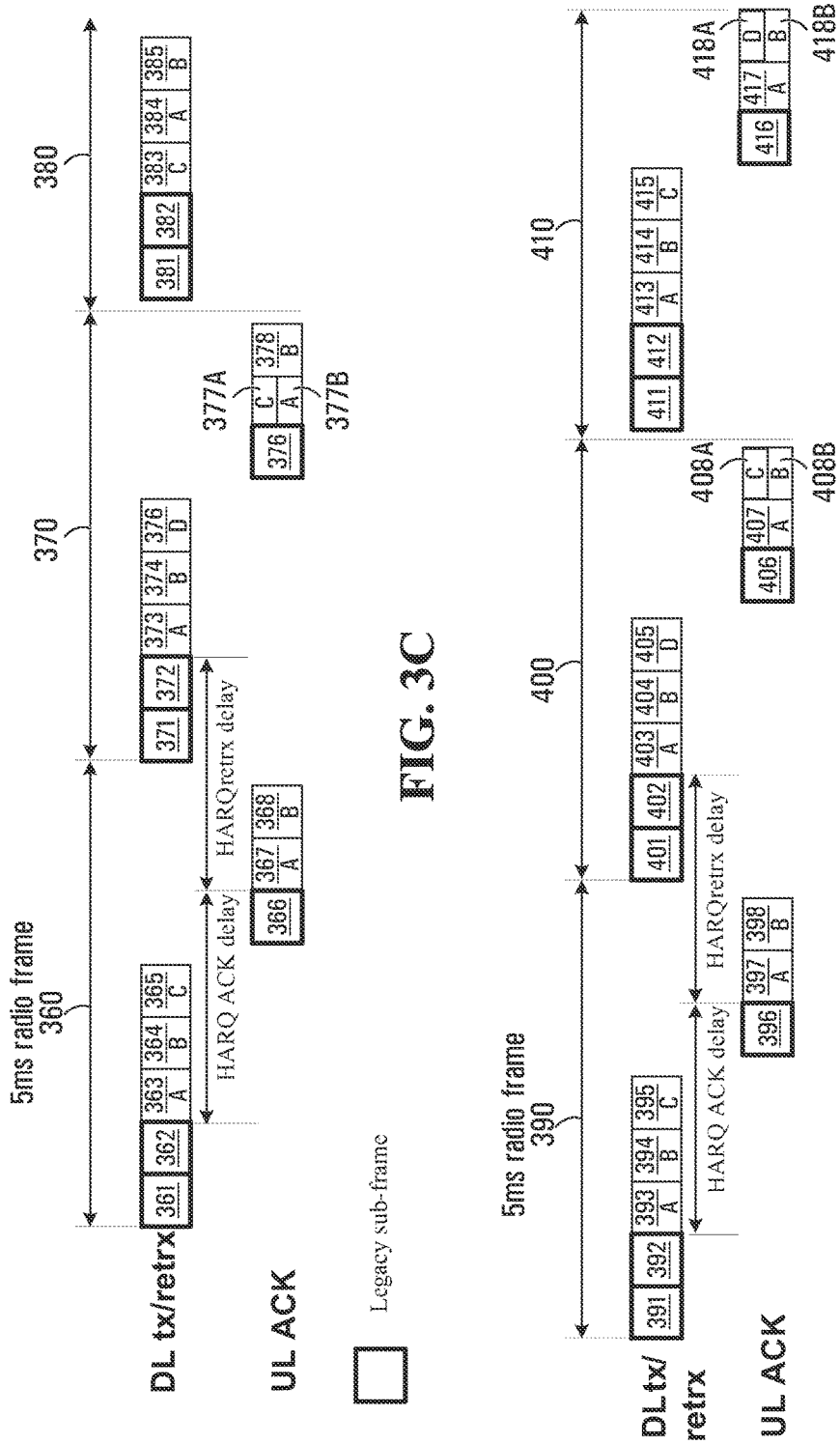

FIG. 3C illustrates an example which has a similar 8 sub-frame per frame 5 ms radio frame, five sub-frame/three sub-frame per frame partition for DL transmissions and UL ACKs, four sub-frame ACK delay, 4 sub-frame Retransmit delay, and TDD DL/UL ratio of 3:2 as illustrated in FIG. 3B. In FIG. 3C the sub-frame location within a radio frame for ACK and retransmission of a HARQ interlace change over time to accommodate the minimum ACK delay and retransmission delay. However, the ordering of the HARQ interlaces can change over time. For example, the ordering of the retransmissions in the allocated sub-frames is "ABCABD-CAB" as seen by A(sub-frame 363), B(sub-frame 364), C(sub-frame 365), A(sub-frame 373), B(sub-frame 374), D(sub-frame 375), C(sub-frame 383), A(sub-frame 384), B(sub-frame 385). The ordering of the ACKs in the allocated sub-frames follows that of the transmitted pattern in the form A(sub-frame 367), B(sub-frame 368), C(sub-frame 377A), A(sub-frame 377B), B(sub-frame 378). As can be seen in FIG. 3C, the UL ACK in 377A and 377B for interlaces C and A, respectively, share a single sub-frame.

FIG. 3D illustrates an example which has a similar 8 sub-frame per frame 5 ms radio frame, five sub-frame/three sub-frame per frame partition for DL transmissions and UL ACKs, four sub-frame ACK delay, 4 sub-frame Retransmit delay, and TDD DL/UL ratio of 3:2 as illustrated in FIG. 3B.

In FIG. 3D the sub-frame location within a radio frame for ACK and retransmission of a HARQ interlace is fixed. For example, the ordering of the retransmissions in the allocated sub-frames has the pattern "ABCABD" as shown by A(sub-frame 393), B(sub-frame 394), C(sub-frame 395), A(sub-frame 403), B(sub-frame 404), D(sub-frame 405), A(sub-frame 413), B(sub-frame 414), C(sub-frame 415). The ordering of the ACKs in the allocated sub-frames is A(sub-frame 397), B(sub-frame 398), A(sub-frame 407), C(sub-frame 408A), B(sub-frame 408B), A(sub-frame 417), D(sub-frame 418A), B(sub-frame 418B). As can be seen in FIG. 3D, the UL ACK in 408A and 408B for interlaces C and B, respectively, share a single sub-frame and in 418A and 418B for interlaces D and B, respectively, share a single sub-frame.

Figure 3E:
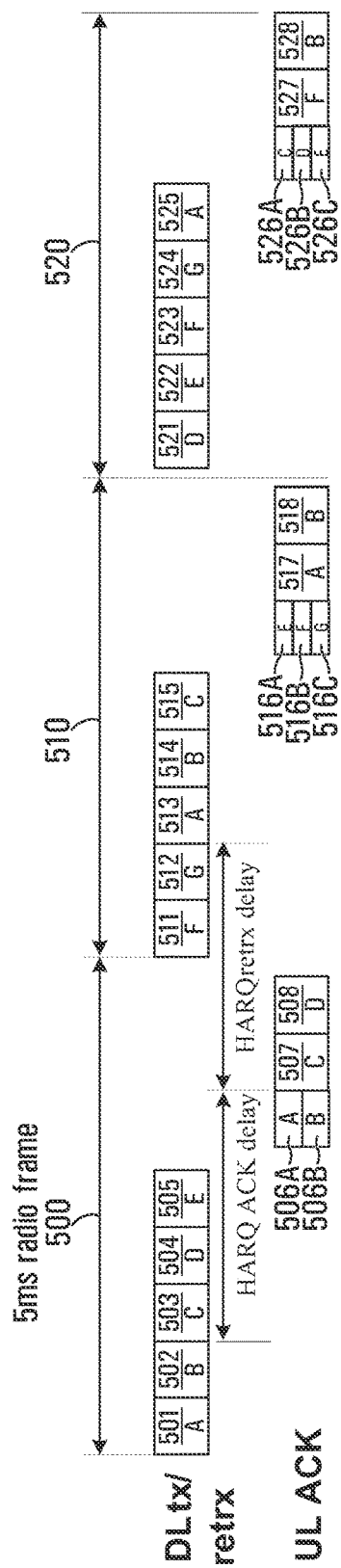

FIG. 3E illustrates three successive 5 ms radio frames 500,510,520 in which in each frame, five sub-frames are used for DL transmission and retransmission and three sub-frames are used for UL ACK. All of the DL transmission sub-frames in each of the frames are for use with equipment that supports IEEE802.16m. All of the UL transmission sub-frames in each of the frames are for use with equipment that supports IEEE802.16m.

As there are five sub-frames allocated for IEEE802.16m DL transmission and retransmission and three sub-frames allocated for UL ACKs, the TDD DL/UL ratio is 5:3.

In FIG. 3E there are 7 HARQ interlaces, sub-frames 501, 513 and 525 is a first interlace "A", sub-frames 502 and 514 are a second interlace "B", sub-frames 503 and 515 are a third interlace "C", sub-frames 504 and 521 are a fourth interlace "D", sub-frames 505 and 522 are a fifth interlace "E", sub-frames 511 and 523 are a sixth interlace "F" and sub-frames 512 and 524 are a seventh interlace "G".

The ACK delay and the Retransmit delay are each illustrated to be four sub-frames in the example of FIG. 3B.

In FIG. 3E, the sub-frame location within a radio frame for ACK and retransmission of a HARQ interlace change over time to accommodate the minimum ACK delay and retransmission delay and retain the same ordering of the HARQ interlaces. For example, the ordering of the retransmissions in the allocated sub-frames is "ABCDEFG" in the form A(sub-frame 501), B(sub-frame 502), C(sub-frame 503), D(sub-frame 504), E(sub-frame 505), F(sub-frame 511), G(sub-frame 512), A(sub-frame 513), B(sub-frame 514), C(sub-frame 515), D(sub-frame 521), E(sub-frame 522), F(sub-frame 523), G(sub-frame 524), A(sub-frame 525). The ordering of the ACKs in the allocated sub-frames is A(sub-frame 506A), B(sub-frame 506B), C(sub-frame 507), D(sub-frame 508), E(sub-frame 516A), F(sub-frame 516B), G(sub-frame 516C), A(sub-frame 517), B(sub-frame 518), C(sub-frame 526A), D(sub-frame 526B), E(sub-frame 526C), F(sub-frame 527), G(sub-frame 528). As can be seen in FIG. 3E, the UL ACK in 506A and 506B for interlaces A and B, respectively, share a single sub-frame, in 516A, 516B and 516C for interlaces E, F and G, respectively, share a single sub-frame and in 526A, 526B and 526C for interlaces C, D and E, respectively, share a single sub-frame.

Deducible UL HARQ Timing

The minimum HARQ ACK and Retransmit delay and the number of HARQ channels are defined in system broadcast signaling which corresponds to particular partitioning of legacy and IEEE802.16m, and TDD DL/UL ratios. With these parameters defined, the precise HARQ timing can be deduced. This concept can be applied to both TDD and FDD.

FIG. 4A illustrates two successive 5 ms radio frames 420,430 that each include 8 sub-frames. Three sub-frames 421,422,423 are a portion of the first radio frame 420 used for UL transmission and retransmission. Sub-frame 421 is for use with legacy equipment and sub-frames 422 and 423 are for use with equipment that supports IEEE802.16m. Three sub-frames 431,432,433 are a portion of a subsequent 5 ms radio frame 430 used for UL transmission and retransmission. Sub-frame 431 is for use with legacy equipment and sub-frames 432 and 433 are for use with equipment that supports IEEE802.16m. Sub-frames 422 and 432 are a first HARQ interlace "A" and sub-frames 423 and 433 are a second HARQ interlace "B".

Five sub-frames 424,425,426,427,428 are a portion of the first 5 ms radio frame 420 used for DL acknowledgement (ACK). Sub-frames 424 and 425 are for use with legacy equipment and sub-frames 426, 427 and 428 are for use with equipment that supports IEEE802.16m. Five sub-frames 434,435,436,437,438 are a portion of the subsequent radio frame 430 used for DL ACK. Sub-frames 434,435 are for use with legacy equipment and sub-frames 436, 437 and 438 are for use with equipment that supports IEEE802.16m.

As there are two sub-frames allocated for IEEE802.16m UL transmission and retransmission and three sub-frames allocated for DL ACKs, the TDD DL/UL ratio is 3:2.

The ACK delay is illustrated to be four sub-frames and the Retransmit delay is also illustrated to be four sub-frames in the example of FIG. 4A.

FIG. 4B illustrates two successive 5 ms radio frames 440,450 and a DL transmission portion of a third radio frame 460 in which in each frame, four sub-frames are used for DL transmission and retransmission and four sub-frames are used for UL ACK. UL transmission sub-frame 441 of the first frame 440 is for use with legacy equipment and UL transmission sub-frames 442, 443 and 444 of the first frame 440 are for use with equipment that supports IEEE802.16m. UL transmission sub-frame 451 of the second frame 450 is for use with legacy equipment and UL transmission sub-frames 452, 453 and 454 of the second frame 450 are for use with equipment that supports IEEE802.16m. UL transmission sub-frame 461 of the third frame 460 is for use with legacy equipment and DL transmission sub-frames 462, 463 and 464 of the third frame 460 are for use with equipment that supports IEEE802.16m.

DL ACK sub-frames 445 and 446 of the first frame 440 are for use with legacy equipment and DL ACK sub-frames 447, including sub-divided portions 447A and 447B, and 448 of the first frame 440 are for use with equipment that supports IEEE802.16m. DL ACK sub-frames 455 and 456 of the second frame 450 are for use with legacy equipment and UL transmission sub-frames 457, including sub-divided portions 457A and 457B, and 458 of the second frame 450 are for use with equipment that supports IEEE802.16m.

As there are three sub-frames allocated for IEEE802.16m UL transmission and retransmission and two sub-frames allocated for DL ACKs, the TDD DL/UL ratio is 2:3.

In FIG. 4B there are 4 HARQ interlaces, sub-frames 442, 453 and 464 is a first interlace "A", sub-frames 443 and 454 are a second interlace "B", sub-frames 444 and 462 are a third interlace "C" and sub-frames 452 and 463 are a fourth interlace "D".

The ACK delay and the Retransmit delay are each illustrated to be four sub-frames in the example of FIG. 4B.

In FIG. 4B, the sub-frame location within a radio frame for ACK and retransmission of a HARQ interlace change over time to accommodate the minimum ACK delay and Retransmit delay and retain the same ordering of the HARQ interlaces. For example, the ordering of the retransmissions in the allocated sub-frames is "ABCD" as seen by A(sub-frame 442), B(sub-frame 443), C(sub-frame 444), D(sub-frame 452), A(sub-frame 453), B(sub-frame 454), C(sub-frame 462), D(sub-frame 463), A(sub-frame 464). The ordering of the ACKs in the allocated sub-frames is A(sub-frame 447A), B(sub-frame 447B), C(sub-frame 448), D(sub-frame 457A), A(sub-frame 457B), B(sub-frame 458). As can be seen in FIG. 4B, the DL ACK in 447A and 447B for interlaces A and B, respectively, share a single sub-frame and in 457A and 457B for interlaces D and A, respectively, share a single sub-frame.

FIG. 4C illustrates an example which has a similar 8 sub-frame per frame 5 ms radio frame, four sub-frame/four sub-frame per frame partition for UL transmissions and DL ACKs, four sub-frame ACK delay, 4 sub-frame Retransmit delay, and TDD DL/UL ratio of 2:3 as illustrated in FIG. 4B. In FIG. 4C the sub-frame location within a radio frame for ACK and retransmission of a HARQ interlace change is fixed. For example, the ordering of the retransmissions in the allocated sub-frames is "ABCDBCABC" as shown by A(sub-frame 472), B(sub-frame 473), C(sub-frame 474), D(sub-frame 482), B(sub-frame 483), C(sub-frame 484), A(sub-frame 492), B(sub-frame 493), B(sub-frame 494). The ordering of the ACKs in the allocated sub-frames is A(sub-frame 477A), B(sub-frame 477B), C(sub-frame 478) D(sub-frame 487A), B(sub-frame 487B), C(sub-frame 488), A(sub-frame 497A), B(sub-frame 497B), B(sub-frame 498). As can be seen in FIG. 4C, the DL ACK in 477A and 477B for interlaces A and B, respectively, share a single sub-frame and in 487A and 487B for interlaces D and B, respectively, share a single sub-frame and in 497A and 497B for interlaces A and B, respectively, share a single sub-frame.

Figure 24:
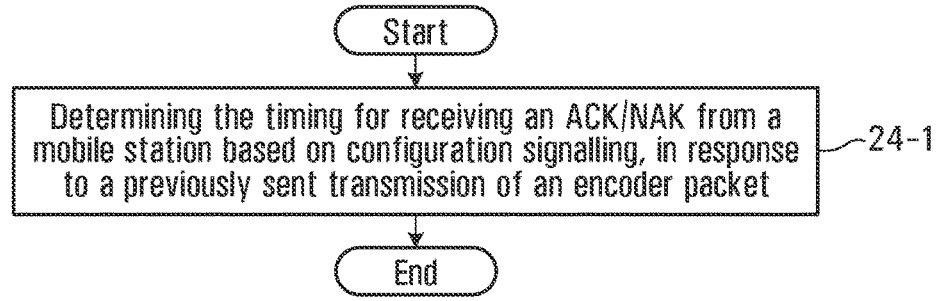
FIG. 24 is a flow chart of an example method according to a further embodiment of the invention.

Referring to FIG. 24, a method will now be described for determining the timing for receiving an ACK/NAK at a base station. A first step 24-1 of the method involves, in a system having a known HARQ acknowledgement (ACK) delay, retransmit delay and number of HARQ interlaces, which are each defined in configuration signalling sent to a mobile station and which are a function of at least one of a time division duplexing downlink/uplink (TDD DL/UL) ratio and a frequency division duplexing downlink/uplink (FDD DL/UL) ratio, at the base station, determining the timing for receiving an ACK/NAK from a mobile station based on configuration signalling in response to a previously sent transmission of an encoder packet by the base station.

In some embodiments, a further step of the method involves sending the configuration signalling.

Figure 25:
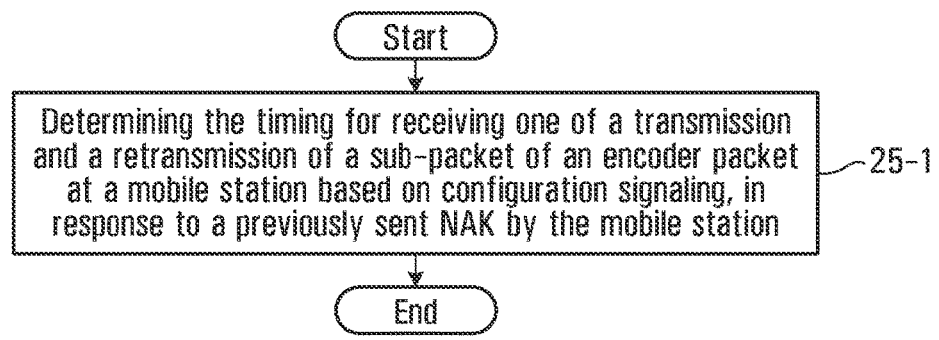
FIG. 25 is a flow chart of an example method according to yet another embodiment of the invention.

Referring to FIG. 25, a method will now be described for determining the timing for receiving one of a transmission and a retransmission of a sub-packet of an encoder packet at a mobile station. A first step 25-1 of the method involves, in a system having a known HARQ acknowledgement (ACK) delay, retransmit delay and number of HARQ interlaces, which are each defined in configuration signalling sent to a mobile station and which are a function of at least one of a time division duplexing downlink/uplink (TDD DL/UL) ratio and a frequency division duplexing downlink/uplink (FDD DL/UL) ratio, at the mobile station, determining the timing for receiving one of a transmission and a retransmission of a sub-packet of an encoder packet at a mobile station based on the configuration signalling in response to a previously sent NAK by the mobile station.

In some embodiments, a further step of the method involves receiving the configuration signalling.

Packet transmissions can be persistent assignments, or non-persistent assignments signalled within specific resource partitions. A persistent resource assignment is an assignment of a predefined, usually reoccurring, resource to a user, such that assignment to that user does not require further signaling for each reoccurrence. Persistent assignments are indicated to other users by a resource availability bitmap (RAB). Examples of implementing an RAB can be found in PCT patent application PCT/2008/001980 filed Nov. 5, 2008, which is commonly assigned to the assignee of the present application and which is incorporated herein by reference in its entirety.

Group assignment of resources using a bitmap is used for non-persistent packet assignments. Each group is assigned a separate resource partition.

In some embodiments division and identification of available resources is indicated by a multicast control segment (MCCS).

In some embodiments, partition of zones is signalled by combination index (CI) which signals the resource partitions within the persistent and non-persistent zones. Examples of a RAB can be found in commonly assigned PCT/2008/001980.

In some embodiments, a look-up table is created with possible resource partitions, for a given total number of resources. For example, possible partitioning of 12 resources can be given by {1, 2, 4, 6}.

Each entry of the look-up table is specified by the CI index. The CI can be transmitted in bit-form, proper encoded, at the beginning of frame. If a persistent sub-zone is specified, the RAB may be sent. In some embodiments, the CI is concatenated and encoded with the RAB. The RAB is a bitmap that indicates which resources are available, and which are occupied with a persistent HARQ transmission. The RAB contains one bit for every resource (or resource block), and the value of the bit indicates whether the resource is in use or available.

Persistent resources that are unused due to packet arrival jitter, silence state, or early termination of HARQ transmissions are shown as available.

In some embodiments, for reliability, a CRC is appended to the concatenated CI and RAB. The resource partitions indicated by the CI divide the set of resources remaining after resources indicated as occupied by the RAB are removed from the resource list. In some embodiments, the size of the persistent zone is transmitted in a secondary broadcast channel.

Figure 5:
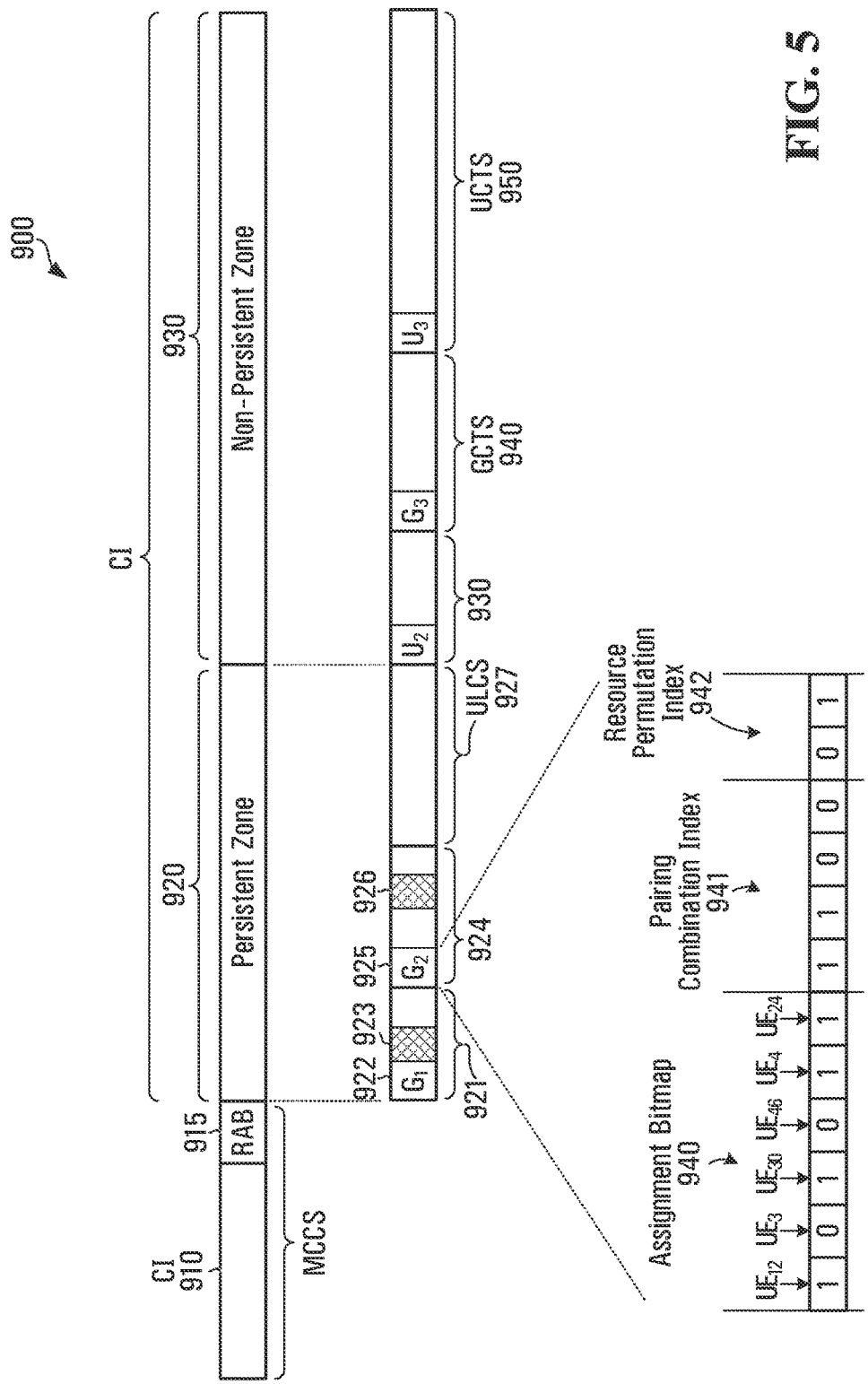
FIG. 5 is a schematic diagram of an example of a resource availability bitmap in which group and unicast allocations can coexist according to an embodiment of the invention.

Referring to FIG. 5, an example of a resource availability bitmap will now be described. FIG. 5 illustrates at least part of a frame 900, having a combination index 910, an RAB 915, a persistent zone 920 that has at least some resources that are persistently assigned, and a non-persistent zone 930 that has no persistently assigned resources. The combination index 910 and the RAB 915 may together be referred to as a multicast control segment (MCCS). In the persistent zone there are three partitions 921,924,927. Two of the partitions 921,924 are group assignments and have signaling bitmaps 922,925, respectively. The third assignment 927 is an Uplink Control segment (ULCS) for defining unicast assignments. In some embodiments, the UCTS may be implemented in a manner similar to that described above with reference to FIG. 2.

In the Non-persistent Zone 930, one of the partitions 940 is a Group control and traffic segment (GCTS) which is used for defining group assignments. Two other partitions 930 and 950 are Unicast control and traffic segments (UCTS) used for defining unicast assignment. In some embodiments, the UCTS may be implemented in a manner similar to that described above for the DL UCTS with reference to FIG. 2.

With reference to group assignment 924, group assignment 924 has a signaling bitmap 925 that includes an assignment bitmap 940, a pairing or sets combination index bitmap 941 and a resource permutation index bitmap 942. The assignment bitmap 940 has 6 bits, one bit for possible assignment to each user. The pairing or sets combination index bitmap 941 has 4 bits. The resource permutation bitmap 942 has 2 bits. Group assignment 921 has a signaling bitmap as well.

In group assignment 924 also indicated is a persistently assigned resource 926 (gray shaded portion of group assignment 924) that is in use and as such is not available for assignment to other users. Similar persistent assignments are shown in group assignments 921 and 927.

In some embodiments, superposition can be used to transmit multiple packets on the same resource by making use of different users' geometries, and an altered packet structure for to enable interference cancellation of some packets while maintaining security.

In some embodiments, superposition of multiple assignments can be achieved by assigning them to the same resources, or set of resources. In some embodiments, this process can be used to superposition persistent and non-persistent assignment.

Multiplexing of persistent assignments can be achieved by indicating a "busy" resource, as available in the RAB. By indicating a persistent used resource as available in the RAB, other indicated assignments will use the resource as well (groups or otherwise). Hence the persistent transmission and other transmissions will be sent simultaneously on the same resource. If all persistent assignments are to be indicated as available, the RAB does not need to be sent.

In some embodiments, superposition can also be used to multiplex users on the downlink by allowing a persistent user and other signalled user(s) to be allocated to the same resource. This is useful for multi-user MIMO applications. Superposition of the persistent assignment and signalled assignment can be achieved this way.

A decision to indicate a persistent assignment resource that is in use as "busy" or "available" in the RAB can be made at the base station dynamically for each assignment, in each time frame.

The decision may be based on at least one of: geometries of mobiles for which the different packets are intended and reliability of the different packets. Users that have high geometry are users that have good long-term channel conditions for communicating with their serving base station. Therefore, it is desirable in some situations to provide bitmaps for users with generally good channel conditions.

A mobile station is configured to check for presence of superpositioned persistent assignment by determining that its transmission occurs in the persistent sub-zone. In some embodiments the mobile station is configured to check for presence of superpositioned persistent assignment by detecting an indication of a "number of layers" field, which can be appended to the CI (within MCCS field). In some embodiments, the field may correspond to the number of layers, either superposition or MIMO, for each partition. In some embodiments, the mobile station is configured to check for presence of superpositioned persistent assignment based on received power threshold detection. In some embodiments, the mobile station is configured to always check for presence of superpositioned persistent assignment.

In some embodiments the packet intended for the lower geometry mobile station (e.g. persistent assignment) can be encoded in a manner that allows it to be decoded. In some embodiments, the decoding is verified with the use of a CRC, which enables the transmission to be used for interference cancellation (IC). However, users that decode the transmission will not be able to have access to the usable data as it will remain scrambled by the intended user's identification (ID) sequence.

In some systems, a persistent assignment can be used. Persistent assignment is defined as an assignment on a predefined resource for one or more HARQ transmissions. It is possible to assign other user(s) to the same resource. Unicast or group signaling are two examples of such signaling methods to assign these resources.

The base station may utilize the same resource for transmitting one or more persistent assignments, and one or more signaled assignments in order to improve capacity. The persistent packet transmission is altered in a manner to allow the mobile station receiving a non-persistent transmission to receive and decode it for the purpose of interference cancellation, without the ability to descramble it. A mobile station receiving a persistent transmission decodes the altered packet in a regular fashion, adding extra steps to undo the alteration to allow it to be decoded for the purpose of interference cancellation of the packet.

In general, when two or more packets are superpositioned on the DL and are intended for different users, the packet transmission with a higher reliability (packet A) is altered in a manner to allow the mobile station intended to receive a different transmission (with lower reliability, (packet B)), to receive the higher reliability transmission (packet A) and decode it for the purpose of interference cancellation, without the ability to descramble it. A mobile station intended to receive a packet that has been altered to allow a different user(s) to decode it for the purpose of interference cancellation, decodes the altered packet in a regular fashion, but includes extra steps to undo the alteration the packet. A mobile station intended to receive the altered packet (packet A) transmission that has been superpositioned with another packet decodes the altered packet.

As the packet that is sent at higher reliability may be readily decoded at a different mobile station after only one transmission, the mobile can make use of the decoded higher reliability packet for interference cancellation of its own transmission in each frame. One transmission can be sent with "higher reliability" by any one of, but not limited to: using a higher power level; using a more robust coding scheme; and using a higher processing gain (i.e. spreading). This process may be used for both Chase combining case and incremental redundancy (IR) HARQ transmission case.
Process for Superpositioned Packet to be Used in Interference Cancellation The packet intended for the lower geometry mobile (e.g. persistent assignment) can be encoded in a manner that allows it to be decoded by others users, and verify decoding with a CRC, enable use of the transmission for efficient interference cancellation (IC). However, these user with not be able to have access to the usable data as then it will remain scrambled by the intended users identification sequence.

This process involves using two cyclic redundancy checks (CRC's); a first CRC is applied before scrambling by the intended user identification sequence and a second CRC is applied after. Other mobile stations will be able to use the second CRC for confirming correct decoding of the transmission, while the first CRC confirms the intended user of the packet after correct descrambling.

In order to enable superposition and detection involving interference cancellation of one or more layers of packets for applications such as transmission of two (or N, where N equals the numbers of users) different packets, to two (or N) different users. The packet that is sent at higher reliability can be further appended with a CRC and scrambled with an identifying sequence, in addition to normal encoding and scrambling procedures.

Figure 6A:
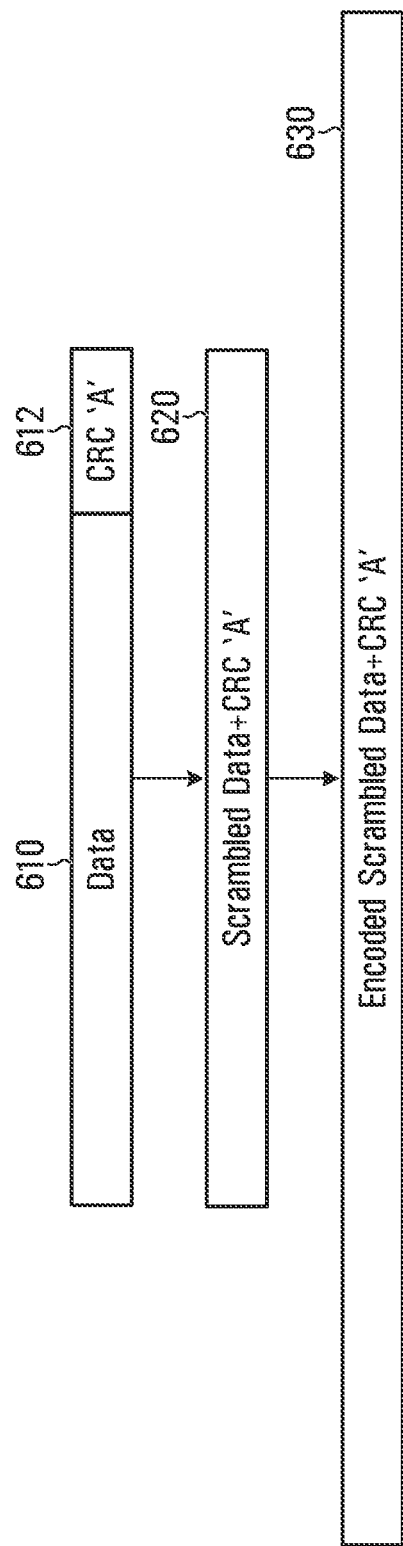
FIG. 6A is a schematic diagram of a conventional packet preparation.

Referring to FIG. 6A, an example of how a packet 610 with an appended CRC 'A' 612 is scrambled and encoded in a conventional manner will now be described. The packet 610 includes N data bits. The CRC 'A' 612 is appended to the end of packet 610. The combined data and CRC are scrambled using an identification sequence. In some implementations the identification sequence may be one of, but not limited to, a sector ID and a userID or a MAC ID, to create a scrambled packet 620. The scrambled packet is then encoded, to created an encode packet 630. In some implementations the encoding may be one of, but not limited to, turbo encoding, convolutional encoding, LDPC encoding.

Figure 6B:
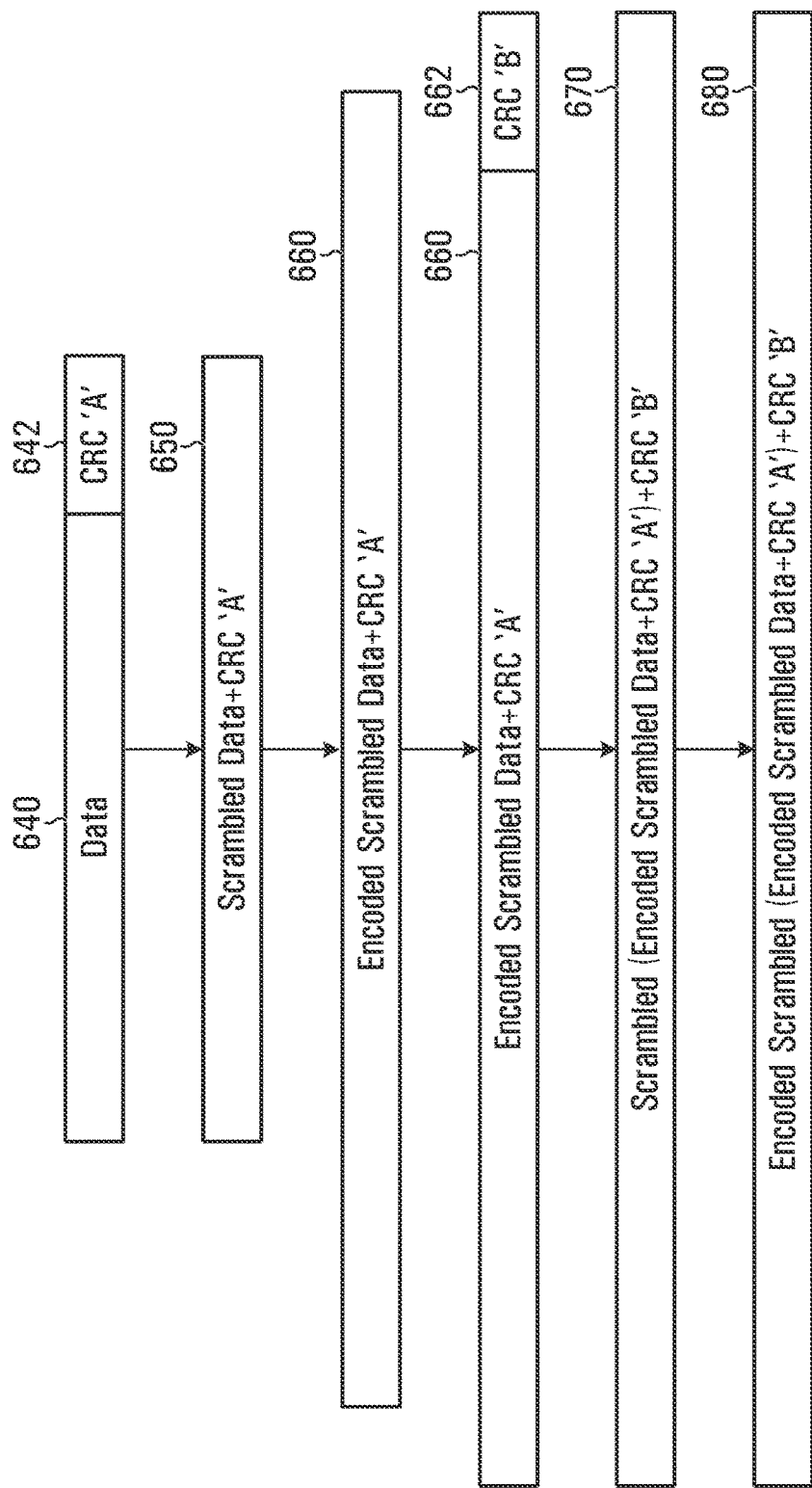
FIG. 6B is a schematic diagram of a packet preparation process for superposition of a packet for use in interference cancellation according to an embodiment of the invention.

Referring to FIG. 6B, an example of how a packet 640 with an appended CRC 'A' 642 is scrambled and encoded and then the encoded packet 660 appended with another CRC 'B' 662 and scrambled again according to an embodiment of the invention will now be described. Such a method can be used in interference cancellation for superpositioned packets.

The first several steps are similar to the steps described above with regard to FIG. 6A and result in an encoded, scrambled packet 660. A CRC 'B' 662 is appended to the end of the encoded, scrambled packet 660. The encoded packet 660 and CRC 'B' 662 are scrambled using an additional identification sequence known to multiple users to create a scrambled packet 670, thus allowing any of the multiple users to descramble the scrambled packet. In some implementations the identification sequence may be a sector ID. The scrambled packet 670 is then encoded, to create an encoded packet 680. In some implementations the encoding may be one of, but not limited to, turbo encoding, convolutional encoding, LDPC encoding.

The second scrambling step is optional and may not be used in al implementations.

In some cases for either process, the scrambling with identification sequence can be performed on the data only, CRC only, or both Data+CRC.

Figure 7:
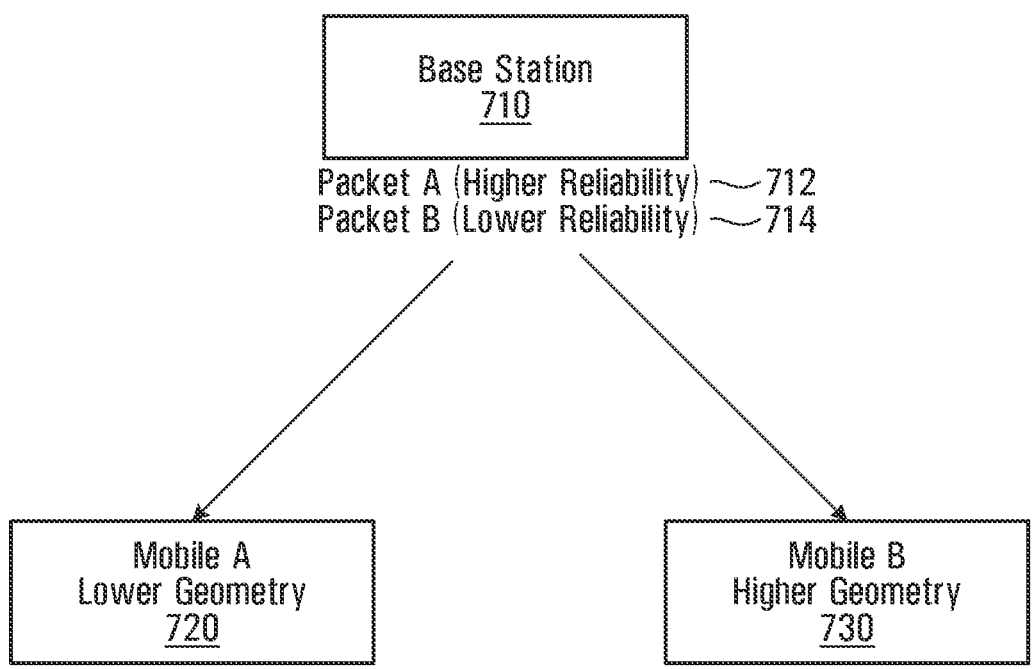
FIG. 7 is a schematic diagram for a system in which a packet preparation process is used for superposition of a packet according to an embodiment of the invention.

Other scrambling, interleaving, modulation blocks may be added to this chain. Only essential steps significant to this description are included.
Process for Detection and Reception of Packets at Two Mobiles Referring to FIG. 7, an example of how superpositioned packets may be transmitted and decoded using interference cancellation according to the double scrambling and double encoding described above, will now be described.

Mobile Station A 720, at a lower relative geometry, is intended to receive Packet A 712 that has been altered according to double scramble/double encoding described above. The resource for transmitting the packet may be persistently assigned.

Mobile Station B 730, at a higher relative geometry, is intended to receive Packet B 714 that has been encoded according to single scramble/single encoding described above. Both packets are sent on they same resource. If the transmission for Packet A 712 is persistently assigned, the resource is indicated as "available" on the RAB. It is possible that multiple packets belonging to one on more users are sent on resources that overlap for some transmissions.
Process at Mobile A An attempt to decode and descramble the "outer layer" of encoding and scrambling, if the outer layer of scrambling is used, is made for Packet A 712, using CRC 'B' for verification of correct decoding. If Packet A 712 is decoded successfully, the packet is descrambled with an identification sequence using CRC 'A' for verification of correct decoding/descrambling. If not decoded successfully, a retransmission process is followed as specified by HARQ, if desired. In some embodiments, this may include RAS-HARQ retransmission using the control information signaling techniques described above.

For example, in HARQ the unsuccessful transmission may be retained at the mobile to be combined in some way (incremental redundancy or chase combining) with additional retransmissions.
Process at Mobile B An attempt to decode and descramble (if used) packet A, is made using CRC 'B' for verification of correct decoding.

If decoded successfully, interference cancellation can be used to essentially remove Packet A 712 from the combined transmission of Packet A 712 and Packet B 714, which is intended for Mobile B 730, since the two packets are transmitted in the same resource. If Packet B 714 is not decoded successfully, HARQ schemes can be used to try to recover the packet.

If other packets are superpositioned, either partially or completely with Packet B, an attempt can be made to detect and cancel these packet as well using similar processes of successive interference cancellation. From the resulting signal, an attempt can be made to decode Packet B. If desired, a HARQ re-transmission process can be used in recovering and detecting the packet.

For example, in HARQ the unsuccessful transmission may be retained at the mobile to be combined in some way (incremental redundancy or chase combining) with additional retransmissions. Successfully decoded packets intended for other users can be used for additional channel estimation reliability. Power level may need to be detected blindly, if not known.

Benefits of the above process include:

1) enabling superposition, and thereby reducing resources used for transmission (capacity enhancement);

2) making use of targeting different geometries so that a transmissions are sent with different reliabilities. In some embodiments, a transmission arrives at a different mobile, and can be reliably received to enable interference cancellation without re-transmissions. In some embodiments, transmission intended for mobile with lower geometry is not significantly affected by presence of superpositioned packet;

3) allowing a mobile station to decode and use a packet intended for a different mobile for the purpose of interference cancellation, without allowing the mobile to de-scramble the actual usable data;

4) allowing persistent resources to be indicated as "available", which allows the RAB to be shortened or omitted as default without RAB for resources is "available";

5) the additional cost is only an additional CRC appended to transmissions.

In some embodiments the process is especially useful for VoIP applications as packet sizes/coding rates/modulation schemes are limited to a finite number of hypothesis. In some applications, the VoIP packet to used for interference cancellation may be a fixed parameter (or very limited set). For example, one modulation and coding scheme for each packet size, with fixed resource allocation size.

DL Control Channel Structure

In some embodiments, subzones can be created within a frame structure to enable DL channel control. A frame is a physical construct for transmission that once it is set is not changed, while a subzone is a portion a frame that is configurable as a scheduling construct, whose size and shape may change within the frame for a given situation. For example, in an OFDM application, subzones may consist of multiples of 2 OFDM symbols over a block of sub carriers. In some embodiments, the block of sub-carriers is the entire set of the sub-carriers of an available band.

In some embodiments, a basic channel unit (BCU) allocation block (BAB) may consist of one or more BCUs. A BCU is a two dimensional time-frequency transmission resource, i.e. a given number of symbols over a given number of sub-carriers. The sub-carriers may be physical sub-carries or logical sub-carriers that are permuted based on a particular mapping of physical sub-carries to logical sub-carries. In some embodiments, within a subzone, a BAB has a same number of time-frequency resource blocks per OFDM symbol. In some embodiments, this may be true when averaged over one or more frames. While OFDM symbols are referred to specifically, it is to be understood that OFDM is considered for illustrative purposes, and other transmission formats are contemplated.

In some embodiments, different subzones may have different BAB configurations. For example, a first subzone has 4 OFDM symbols in which each BAB has 2 BCUs. In another example, a second subzone has 4 OFDM symbols, in which some BABs have 4 BCUs and other BABs have 8 BCUs. In yet another example, a third subzone has 6 OFDM symbols, in which each BAB has 12 BCUs.

In some embodiments, an extended frame can be supported by defining a separate zone. The BCUs in the separate zone of the extended frame use the same channelization as in the non-extended frame zone. No additional complexity is required.

In some embodiments, in the separate zone of the extended frame, the control channel, be it an MCCS or a unicast control channel, occurs every k frames. Each assignment in the separate zone of the extended frame is for k frames.

The unicast control information is contained within an associated partition in the first sub-frame. In this design, transmissions using extended sub-frames can co-exist with transmissions using non-extended sub-frames. This way only the mobiles that use the extended zone are affected by the increased latency.

A separate zone in the extended frame can be defined for UL transmissions as well for DL transmissions.

In some embodiments, an access grant message contains a user ID of a mobile station that initiated a request for access. An access grant message is contained in a UL control segment and it is scrambled by the sequence that the mobile station used in the UL random access channel.

In some embodiments, the UL control segment contains the following fields: an MCCS, a unicast assignment message, a group assignment message and a UL access grant message. The MCCS contains a combination index and/or permutation index and a RAB if persistent resources have been allocated. Examples pertaining to implementation of the combination index, permutation index and RAB can be found in commonly assigned PCT/2008/001980. The unicast assignment message may include multiple unicast assignment messages, one for each assignment. The group assignment message may include multiple group assignment messages, one for each assignment.

Persistent resources are allocated using a persistent assignment message. There are separate persistent assignment messages for both DL and UL assignments. In some embodiments, each message contains a resource ID (BCU) and a number of resources assigned. In some embodiments each message contains a bitmap indicating the assigned resources. In the bitmap approach, the length of the bitmap is the length of the persistent zone. In some embodiments, the length of the persistent zone is signalled in a super-frame control.

In some implementations, a UL persistent assignment message is contained in the UL control segment. In some implementations, the UL persistent assignment message is contained in a separate partition.

In some implementations, DL/UL persistent assignment messages are scrambled by the user ID of the intended user.

In a multi-user MIMO (MU-MIMO) case, in which multiple users are assigned to a same partition of a transmission resource, separate unicast messages are provided for each user assigned to the same partition.

In some embodiments, the unicast control segment contains a MU-MIMO header, which is a multicast message that is targeted to the lowest geometry user in the assignment.

The MU-MIMO header contains information identifying a message type, which indicates a number of layers that are multiplexed on to the same resource and a pre-coding matrix index (PMI) that is used for the transmission in the case of codebook based pre-coding feedback. The PMI is a matrix with a number of columns equal to the number of layers that are multiplexed on a resource. Each column consists of a pre-coding vector for the corresponding layer.

In some embodiments, the MU-MIMO header is CRC protected. This is then followed by individual unicast messages for each assignment. The individual unicast messages contain the MCS of the assignment. In some implementations each unicast message is scrambled by the user ID of the intended user. In some implementations the unicast messages are CRC protected.

In some embodiments, the DL ACK channel is used to acknowledge UL data transmission. A fixed number of diversity resources are allocated to a group of control channels that includes, but is not limited to: DL ACK; UL power control channel; and the MCCS.

In some implementations, the number of resources for the DL ACK channels and the location of the resources are signalled in a super-frame control. In some implementations, each DL ACK channel consists of N tones that are spread over the entire band. In some implementations, each DL ACK channel is power controlled to the intended user. In some implementations, for the DL power control channel, one channel is assigned to each user for the purpose of power control.

Multi-Carrier Configuration for OFDM System

According to another aspect of the invention there are provided methods for adjacent multi-carrier configuration of OFDM system to ensure sub-carriers alignment between adjacent carriers.

Figure 8:
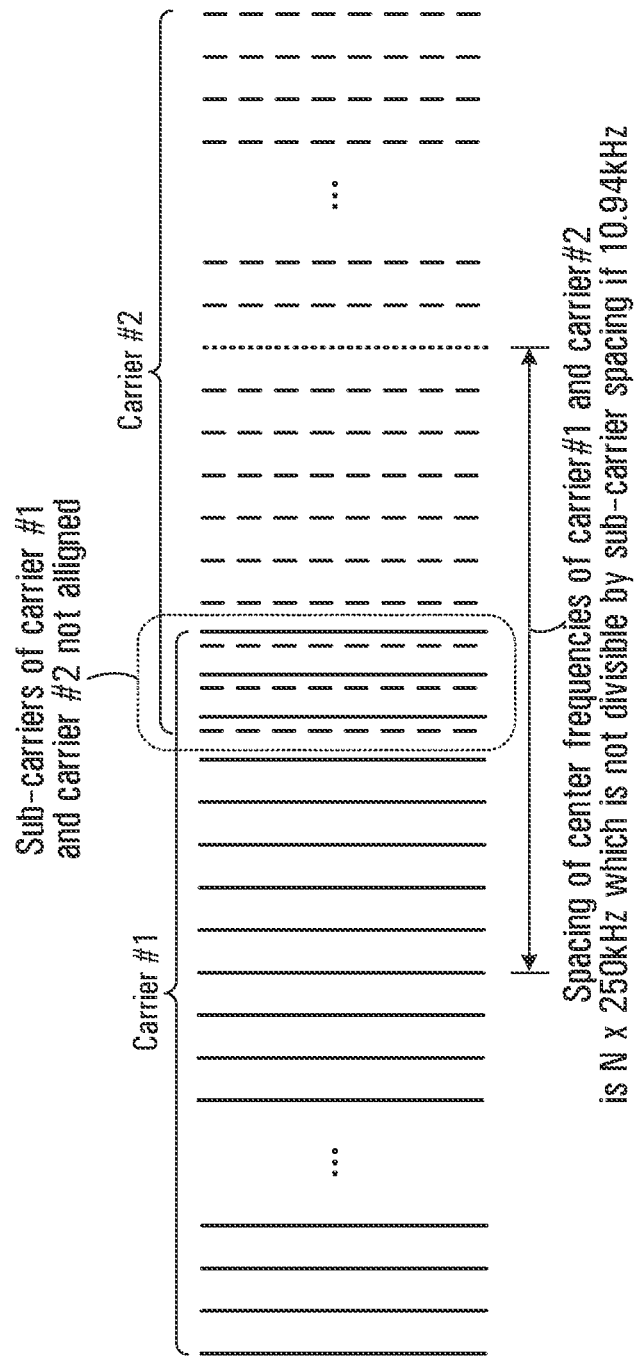
FIG. 8 is a schematic diagram of sub-carriers of two adjacent carriers that are not aligned due to the spacing of the respective carriers.

In a current WiMAX/802.16e schemes, the frequency raster of 250 kHz is not divisible by the WiMAX/802.16e sub-carrier spacing of 10.94 kHz. In a situation where the spacing of center frequencies of adjacent carriers are an integer multiple of the raster size of 250 kHz, the OFDM sub-carriers between two adjacent carriers are not aligned. Referring to FIG. 8, an example is illustrated in which a first carrier is shown having a first set of sub-carriers and a second carrier is shown having a second set of sub-carriers. The spacing of the center frequencies of the first carrier and the second carrier is N×250 kHz, which is not divisible by 10.94 kHz. This situation of non-aligned sub-carriers will cause inter-carrier interference.

A proposed solution to this problem is changing the sub-carrier spacing to 12.5 kHz which is divisible by raster size of 250 kHz. However, this solution introduces a new sub-carrier spacing that is not backward compatible with existing WiMAX schemes.

To support backward compatibility, three sets of OFDM sub-carrier spacing have been adopted in IEEE 802.16m-08/003r1. These spacings include 7.81 kHz, 9.77 kHz and 10.49 kHz. However, details regarding adjacent carrier configuration such as carrier spacing, sub-carrier alignment and guard tones have not been described.

For the cases of sub-carrier spacing of 7.81 kHz and 9.77 kHz, the corresponding system bandwidth is divisible by the proposed sub-carrier spacings. Therefore, in a multicarrier deployment, the center frequencies of adjacent carriers are spaced by integer number of sub-carriers.

In a case in which a wireless device that is compatible with IEEE802.16m is used for communication, there is a zone of a resource allocated for IEEE802.16m transmissions. No guard tones are required on sub-frames within the IEEE802.16m zone between adjacent carriers beyond the carrier bandwidth.

However, to support backward compatibility, sub-frames within a zone allocated for legacy supported carriers contain guard tones between adjacent carriers. In some implementations, guard tones between adjacent carriers are consistent with those guard tone arrangements defined in legacy system permutation formats.

Figure 9:
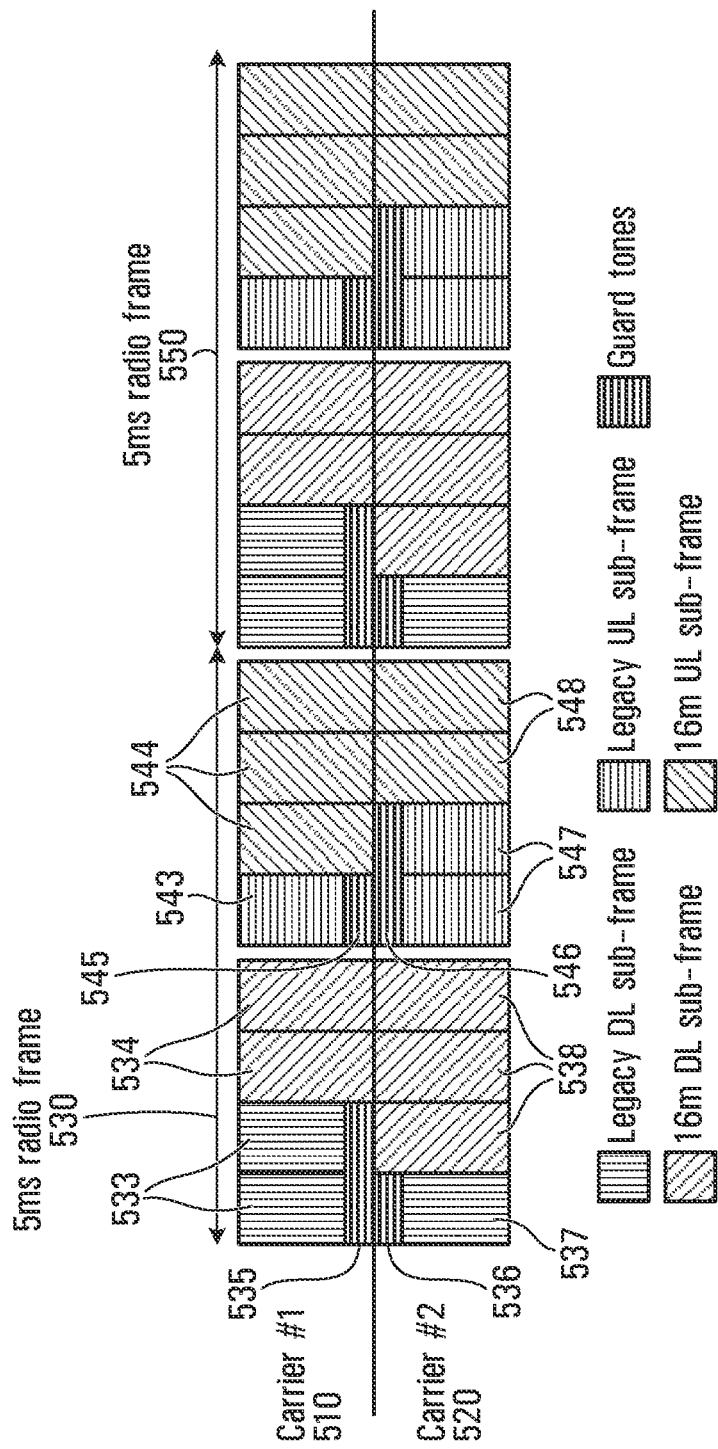
FIG. 9 is a schematic diagram of an example of two adjacent carriers in which each carrier supports both legacy and non-legacy sub-frames in a transmission resource according to an embodiment of the invention.

With reference to FIG. 9, an example of two adjacent carriers each having both legacy and IEEE802.16m DL and UL sub-frame components will now be discussed.

A first carrier 510, having multiple sub-carriers that are not individually shown, but rather which are shown as a block of frequencies in the vertical direction is illustrated over two successive 5 ms radio frames 530,550. A DL portion of each radio frame includes four sub-frames, two of which are legacy sub-frames 533 and two of which are IEEE802.16m sub-frames 534. A UL portion of each radio frame includes four sub-frames, one of which is a legacy sub-frames 543 and three of which are IEEE802.16m sub-frames 544.

A second carrier 520, having multiple sub-carriers in a block of frequencies in the vertical direction is illustrated over two successive 5 ms radio frames. A DL portion of each radio frame includes four sub-frames, one of which is a legacy sub-frames 537 and three of which are IEEE802.16m sub-frames 538. A UL portion of each radio frame includes four sub-frames, two of which are legacy sub-frames 5473 and two of which are IEEE802.16m sub-frames 548.

In the first carrier 510, some sub-carriers of the legacy DL sub-frames 533 are allocated as guard tones 535 between the sub-carriers of the first carrier 510 and the sub-carriers of the second carrier 520. In the second carrier 520, some sub-carriers of the legacy DL sub-frames 537 are allocated as guard tones 536 between the sub-carriers of the second carrier 520 and the sub-carriers of the first carrier 510. However, no guard tones are needed between the sub-carriers of the first carrier 510 and the sub-carriers of the second carrier 520, or vice versa, if the sub-frames are IEEE802.16m sub-frames.

In the first carrier 510, some sub-carriers of the legacy UL sub-frames 543 are allocated as guard tones 545 between the sub-carriers of the first carrier 510 and the sub-carriers of the second carrier 520. In the second carrier 520, some sub-carriers of the legacy UL sub-frames 547 are allocated as guard tones 546 between the sub-carriers of the second carrier 520 and the sub-carriers of the first carrier 510. However, no guard tones are needed between the sub-carriers of the first carrier 510 and the sub-carriers of the second carrier 520, or vice versa, if the sub-frames are IEEE802.16m sub-frames.

FIG. 9 is a particular example for a given size radio frame, number of DL and UL sub-frames and arrangement of legacy and IEEE802.16m supported carriers. These parameters are implementation specific and therefore the particular example of FIG. 9 is not intended to limit the invention. Furthermore, while IEEE802.16m supported carriers are specifically referred above, more generally, the invention can be applied to other supported carriers that are non-legacy supported carriers.

For the case of sub-carrier spacing of 10.94 kHz, system bandwidths of 5/10/20 MHz are not divisible by the sub-carrier spacing. However, N×1.75 MHz, e.g. 5.25 MHz, 10.5 MHz, 21 MHz are divisible by the sub-carrier spacing. In a situation in which two adjacent carriers are legacy support carriers, the center frequencies of the adjacent carriers are spaced apart by the carrier bandwidths in order to ensure backward compatibility. Guard tones are used between the adjacent carriers.

Figure 10:
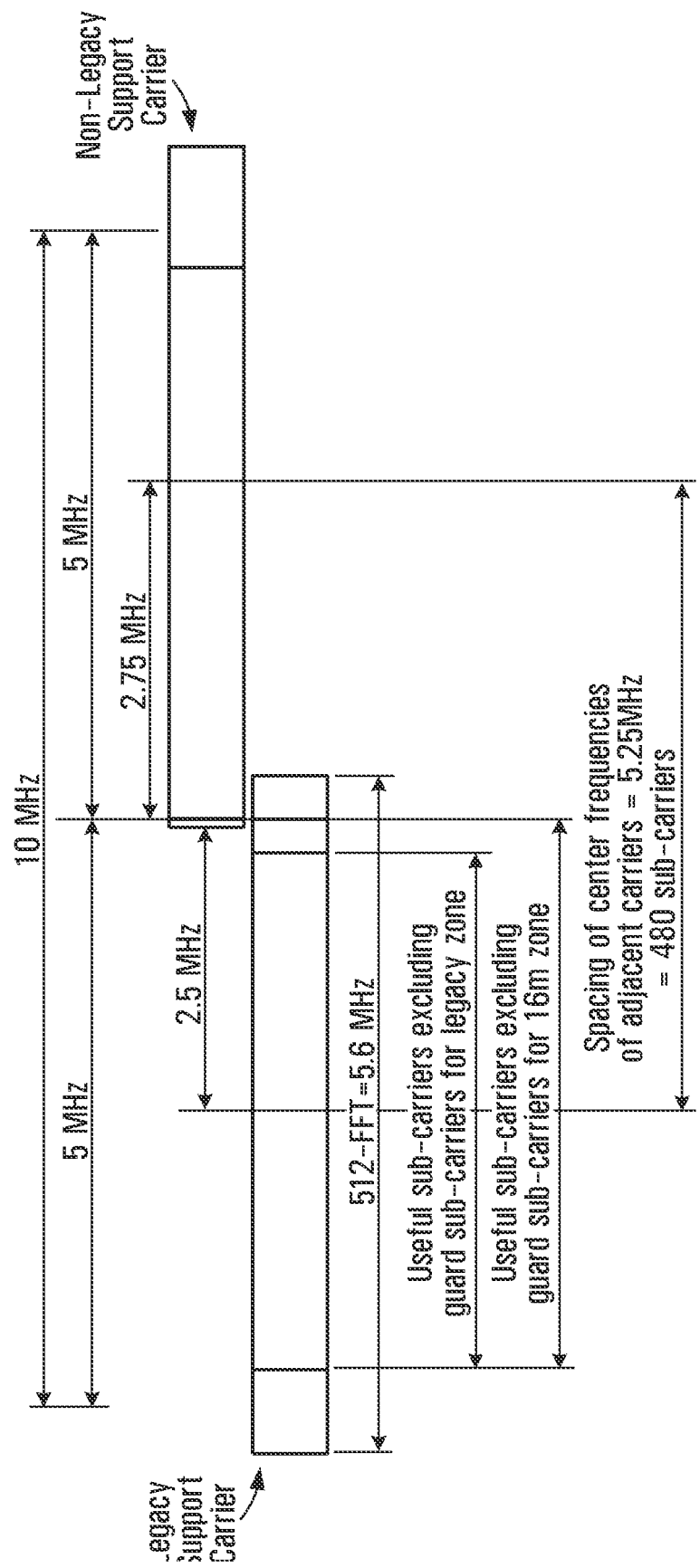
FIG. 10 is a schematic diagram of an example of two adjacent carriers in which one carrier supports legacy transmissions and the other carrier supports non-legacy transmissions according to an embodiment of the invention.

If a non-legacy support carrier is adjacent to a legacy support carrier, the center frequency of the non-legacy carrier can be offset such that the center frequencies of the two adjacent carriers can be spaced by 5.25/10.5/21 MHz respectively for carrier bandwidth of 5/10/20 MHz respectively. Therefore, the center frequency spacing of adjacent carriers can be set to multiples of 5.25 MHz to avoid the sub-carrier misalignment issue. For example, two adjacent 5 MHz carriers are spaced by 5.25 MHz. Two adjacent 10 MHz carriers are spacing by 10.5 MHz. An illustration for carrier bandwidth of 5 MHz is shown in FIG. 10. For the non-legacy carrier, as shown in Figure (next slide), uneven number of guard sub-carriers are used on both sides of a carrier.

On a sub-frame within the non-legacy carrier supported zone, no guard tones are required between adjacent carriers beyond the carrier bandwidth. On a sub-frame within the legacy carrier supported zone, guard tones are still used between adjacent carriers on sub-frames within the legacy zone.

Figure 11:
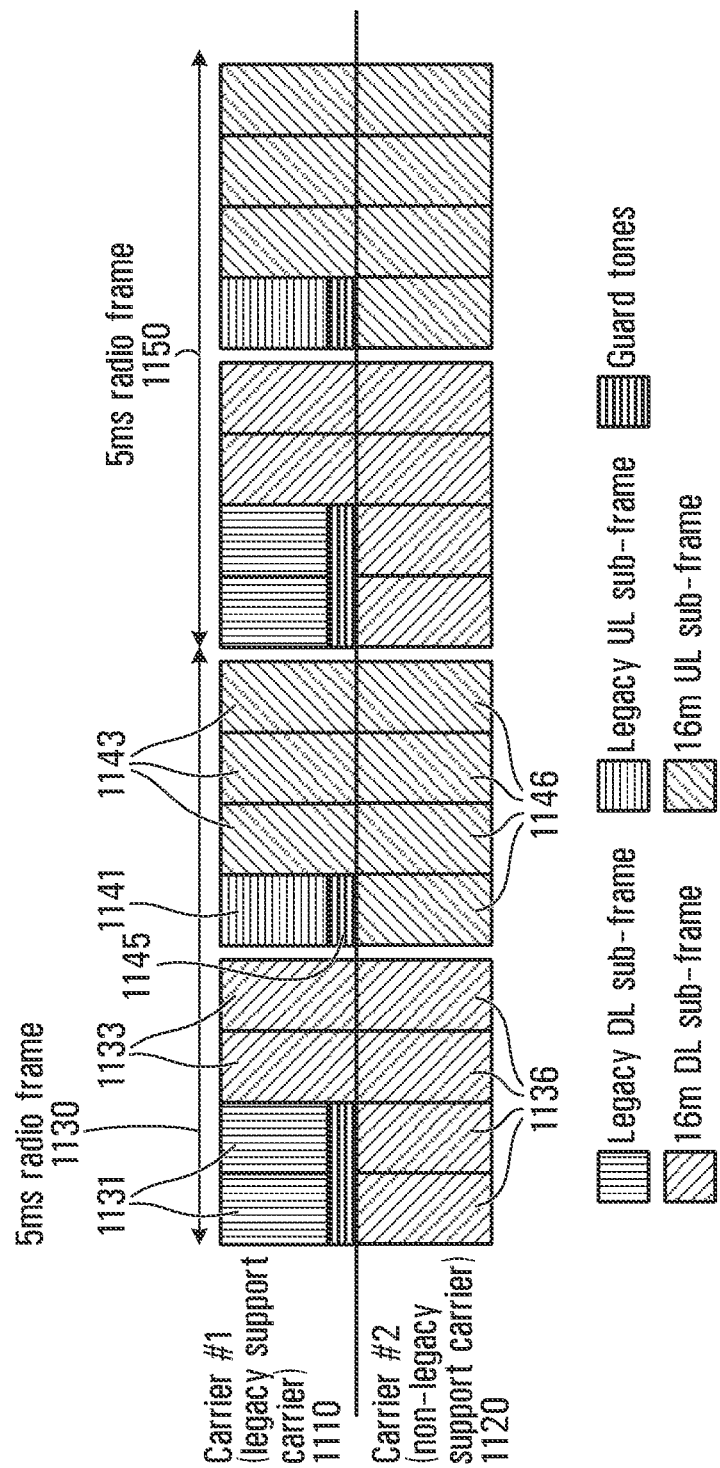
FIG. 11 is a schematic diagram of an example of two adjacent carriers in which one carrier supports both legacy and non-legacy sub-frames in a transmission resource and the other carrier supports only non-legacy sub-frames in the transmission resource according to an embodiment of the invention.

FIG. 11 illustrates an example of two adjacent carriers one having legacy support carriers and one having non-legacy supported carrier in two consecutive 5 ms radio frames 1130,1150.

A first carrier 1110 that includes legacy support, having multiple sub-carriers that are not individually shown, but rather which are shown as a block of frequencies in the vertical direction is illustrated over two successive 5 ms radio frames. A DL portion of each radio frame includes four sub-frames, two of which are legacy sub-frames 1131 and two of which are non-legacy sub-frames 1133. A UL portion of each radio frame includes four sub-frames, one of which is a legacy sub-frames 1141 and three of which are non-legacy sub-frames 1143.

A second carrier 1120 that does not include legacy support, having multiple sub-carriers in a block of frequencies in the vertical direction is illustrated over two successive 5 ms radio frames. A DL portion of each radio frame includes four sub-frames, all of which are non-legacy sub-frames 1136. A UL portion of each radio frame includes four sub-frames, all of which are non-legacy sub-frames 1146.

In the first carrier 1110, some sub-carriers of the legacy DL sub-frames 1131 are allocated as guard tones 1135 between the sub-carriers of the first carrier 1110 and the sub-carriers of the second carrier 1120. In the second carrier 1120, no sub-carriers are allocated as guard tones between the sub-carriers of the second carrier 1120 and the sub-carriers of the first carrier 1110.

In the first carrier 1110, some sub-carriers of the legacy UL sub-frames 1141 are allocated as guard tones 1145 between the sub-carriers of the first carrier 1110 and the sub-carriers of the second carrier 1120. In the second carrier 1120, no sub-carriers are allocated as guard tones between the sub-carriers of the second carrier 1120 and the sub-carriers of the first carrier 1110.

In a specific embodiment, for the case of 2 adjacent 5 MHz carriers, although the adjacent carriers are spaced by 5.25 MHz, there is no wasted bandwidth in between the carriers since the WiMAX OFDM numerology uses over-sampling rate. The effective bandwidth for a 512-FFT is 5.6 MHz. In some implementations, by adjusting the guard sub-carriers on both sides, the gaps between two adjacent carriers can be removed. Furthermore, by adjusting the guard sub-carriers on both sides out-of band spectrum mask requirements may also be met. This is illustrated in FIG. 12a.

As shown in FIG. 12a, an uneven number of guard sub-carriers are used on both sides of a carrier. A number of guard sub-carriers between two adjacent carriers is 16 on each carrier. A number of guard sub-carriers at the edge of the spectrum is adjustable based on the spectrum mask requirements.

There are two scenarios as illustrated in FIGS. 12a and 12b and FIGS. 13a, 13b and 13c.

Scenario 1—an Even Distance Between the Center Carrier Frequencies of Each Carrier and the Spectrum Boundary As shown in FIG. 12a and FIG. 12b, the center frequencies are 2.625 MHz (or 10.5 rasters) from the 5 MHz spectrum boundary. The drawback of this scenario is the center frequency locations are not aligned with the raster boundaries.

Scenario 2—an Uneven Distance Between the Center Carrier Frequencies of Each Carrier and the Spectrum Boundary In scenario 2 center frequency locations are aligned with raster boundaries. As shown in FIGS. 13a and 13b, the center frequency of carrier 1 is spaced 11 rasters from the 5 MHz spectrum boundary. The center frequency of carrier 2 is spaced by 10 rasters from the 5 MHz spectrum boundary. This results in an uneven number of guard sub-carriers between two adjacent carriers. As shown in FIG. 13a, the guard sub-carriers on carrier 1 on the side that is next to carrier 2, is 5. The guard sub-carriers on carrier 2 on the side that is next to carrier 1, is 28. The number of guard sub-carriers at the edge of the spectrum is adjustable based on the spectrum mask requirements.

Figure 13C:
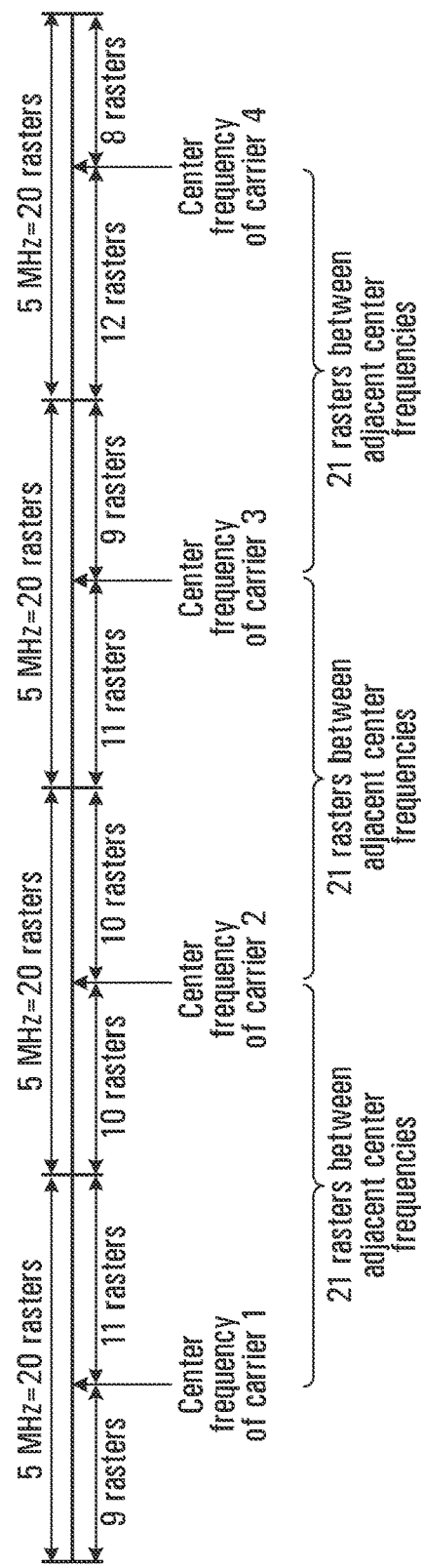
FIG. 13C is a schematic diagram of an example of multiple adjacent carriers in which each of the carriers support non-legacy transmissions according to an embodiment of the invention.

FIG. 13c further shows a general case of more than two adjacent carriers. The spacing of the center frequency from the spectrum boundary is adjusted to ensure the center frequency is aligned with the raster boundaries. In addition, the spacing between center frequencies of adjacent carriers is maintained at 21 rasters.

Figure 14:
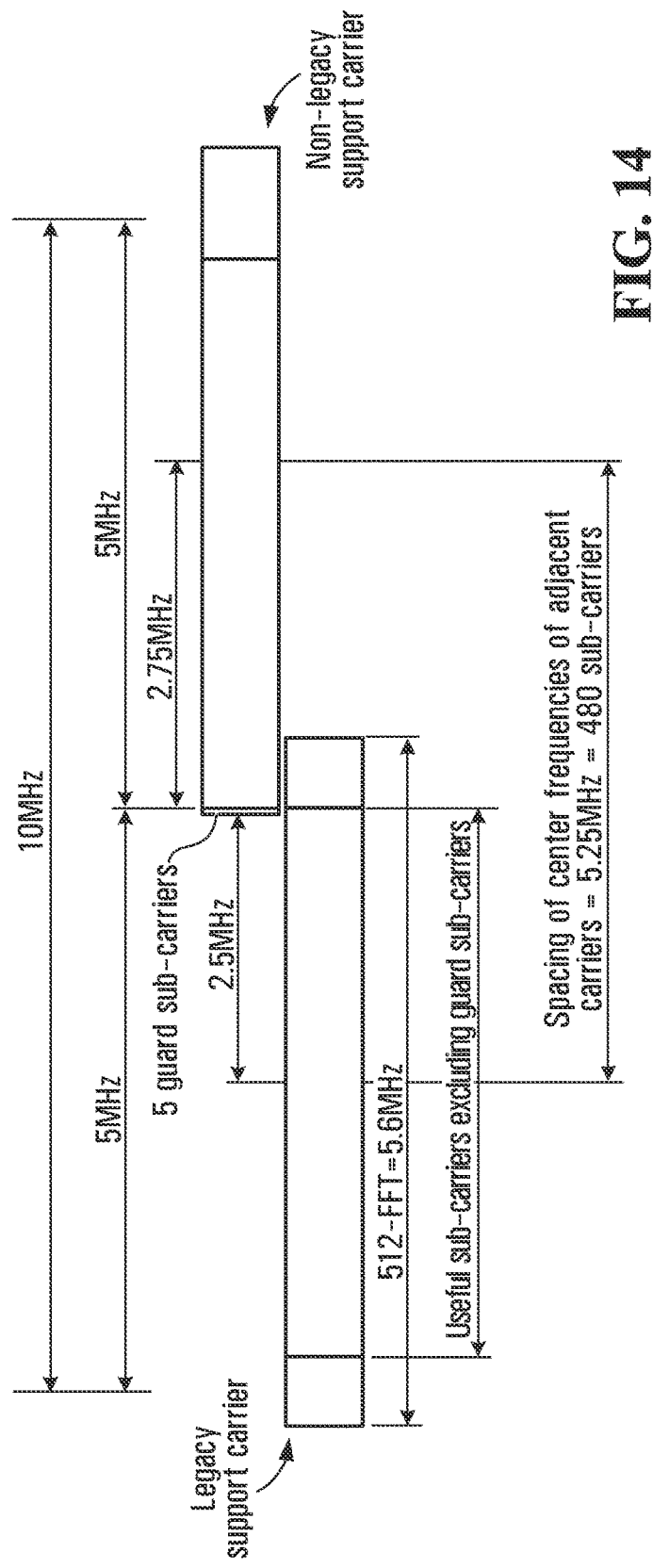
FIG. 14 is a schematic diagram of an example of two adjacent carriers in which one carrier supports legacy transmissions and the other carrier supports non-legacy transmissions according to an embodiment of the invention.

In a specific embodiment that consists of a legacy WiMAX carrier, the carrier frequency of the legacy carrier has to be centered in the 5 MHz band as shown FIG. 14. In this case the adjacent non-legacy carrier has to be further offset in order to maintain the overall 5.25 MHz spacing between the center frequencies. As shown in FIG. 14, for the legacy carrier, a same number of guard sub-carriers are used on both sides of the carrier. For the non-legacy carrier, an uneven number of guard sub-carriers are used on both sides of a carrier. A number of guard sub-carriers on the side that is adjacent to the legacy carrier, is 5 sub-carriers. A number of guard sub-carriers at the edge of the spectrum is adjustable based on the spectrum mask requirements. For other carriers in the spectrum which are not adjacent to a legacy carrier, the approaches described with reference to FIGS. 12a, 12b, 13a, 13b and 13c, may be used.

In some embodiments a method is provided to offset the spacing of the center frequencies of adjacent OFDM carriers to ensure the carrier spacing is divisible by the sub-carrier spacing.

In some embodiments a method is provided to offset the spacing of the center frequencies of adjacent OFDM carriers to have a spacing that is not equal to the bandwidth of each carrier In some embodiments a method is provided to allocate uneven number of guard sub-carriers on both sides of the carrier In some embodiments a method is provided to mix the regular carrier that has same number of guard sub-carriers on both side of the carrier and has center frequency located at the middle of the bandwidth, with a carrier that has uneven number of guard sub-carriers on both side of the carrier and has center frequency that is offset of the middle of the bandwidth.

Description of Example Components of a Communication System

A high level overview of the mobile terminals 16 and base stations 14 upon which aspects of the present invention are implemented is provided prior to delving into the structural and functional details of the preferred embodiments. With reference to FIG. 15, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

With reference to FIG. 16, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labelled only for clarity.

Figure 17:
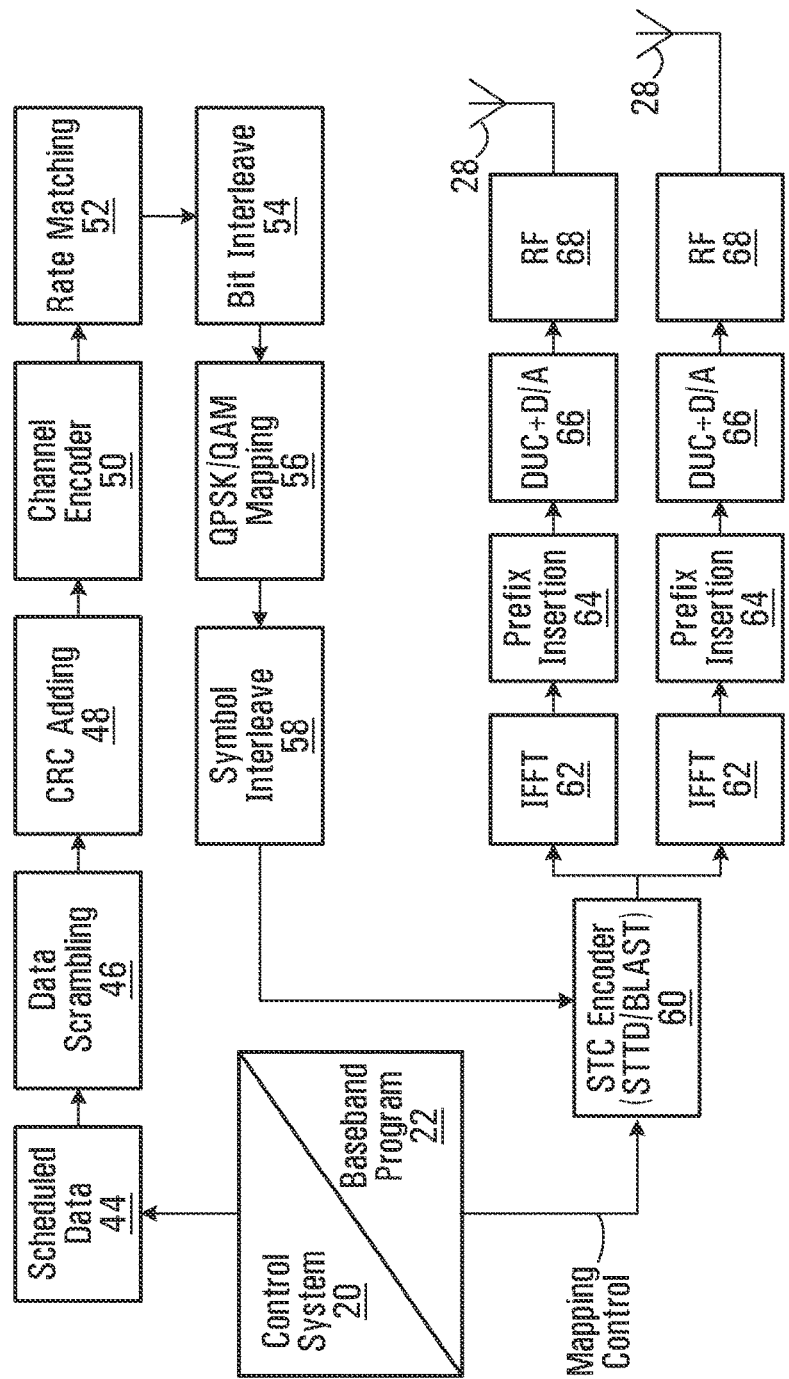
FIG. 17 is a block diagram of a logical breakdown of an example OFDM transmitter architecture that might be used to implement some embodiments of the present invention.

With reference to FIG. 17, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 15 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 18:
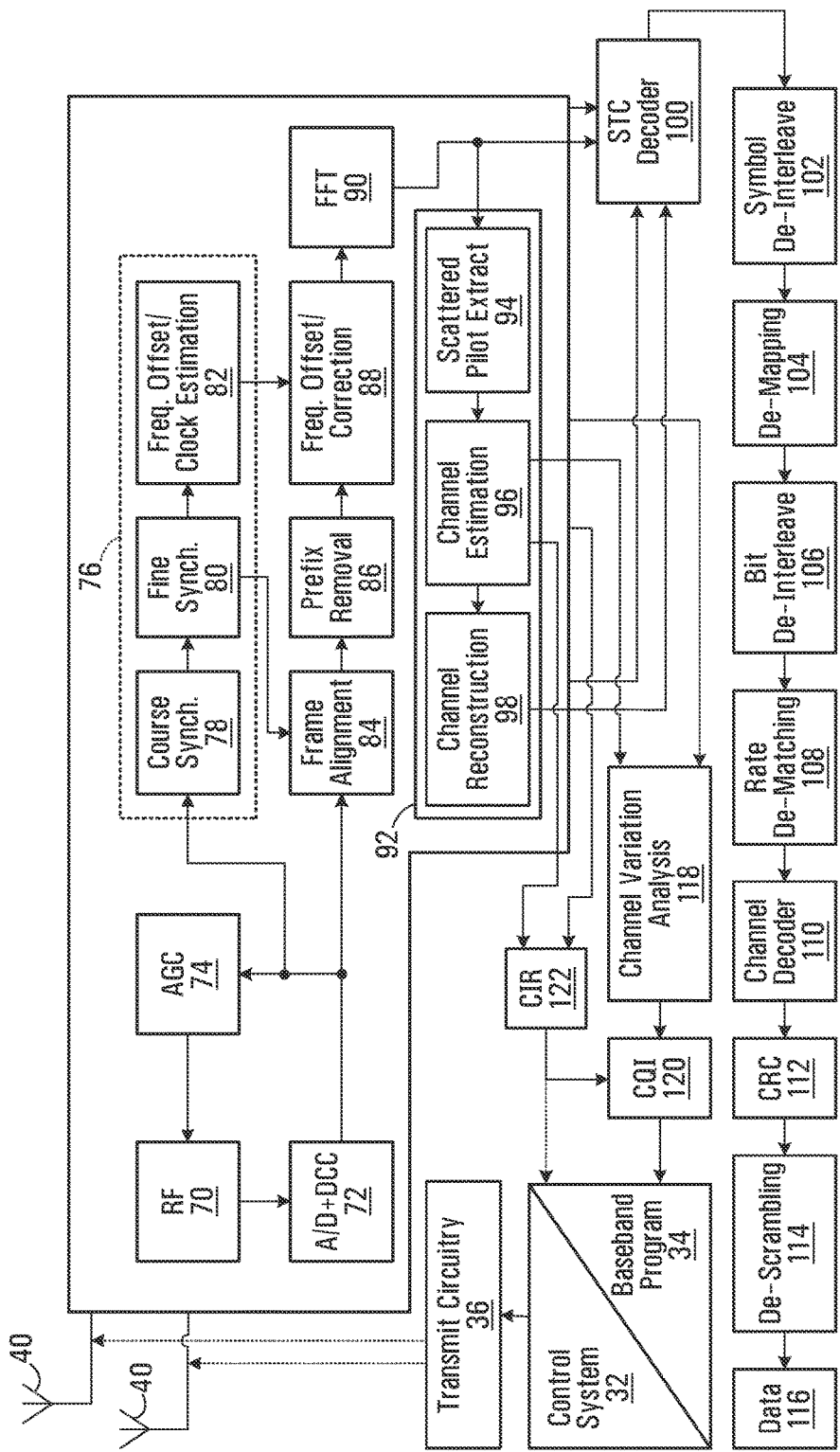
FIG. 18 is a block diagram of a logical breakdown of an example OFDM receiver architecture that might be used to implement some embodiments of the present invention.

Reference is now made to FIG. 18 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and downconversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 18, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The deinterleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 15 to 18 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practised otherwise than as specifically described herein.

The invention claimed is:

1. A mobile station, comprising:
transmit circuitry;
receive circuitry;
one or more antennas; and
a processor in communication with the transmit circuitry, the receive circuitry, and the one or more antennas;
wherein the processor is configured to:
receive, via the receive circuitry, system broadcast signaling, wherein the system broadcast signaling defines a set of parameters, and wherein the set of parameters are a function of a time division duplexing downlink/uplink (TDD DL/UL) subframe ratio;
receive, via the receive circuitry, a first packet transmission from a base station on a DL subframe, wherein the first packet transmission is one of a packet transmission or retransmission; and
determine, in response to the previously received first packet transmission, timing for transmitting a HARQ acknowledgment/negative acknowledgment (ACK/NAK) to the base station, wherein the timing is deducible based on the system broadcast signaling, wherein the timing comprises a configuration wherein a first set of downlink transmissions in a first set of consecutive downlink sub-frames are positively or negatively acknowledged in a subsequent first set of consecutive uplink transmission sub-frames, and wherein the first set of downlink transmissions that are not positively or negatively acknowledged in the subsequent first set of consecutive uplink transmission sub-frames are positively or negatively acknowledged in a subsequent second set of consecutive uplink transmission sub-frames subsequent to a second set of downlink consecutive transmission sub-frames, and wherein an order of retransmissions corresponding to the first set of downlink transmissions is different than the order of the first set downlink transmissions in the first set of consecutive downlink sub-frames to accommodate minimum ACK/NAK delay and retransmit delay.

2. The mobile station of claim 1,
wherein the set of parameters comprise a HARQ ACK delay.

3. The mobile station of claim 2,
wherein the set of parameters further comprise a retransmit delay and a number of HARQ channels.

4. The mobile station of claim 1,
wherein the first packet transmission is comprised in a plurality of first packet transmissions;
wherein the DL subframe is comprised in a plurality of DL subframes;
wherein, to receive the first packet transmission, the processor is further configured to receive each of the plurality of first packet transmissions from the base station on a different DL subframe of the plurality of DL subframes, wherein each of the first packet transmissions is one of a packet transmission or retransmission; and
wherein, to determine the timing for transmitting the HARQ ACK/NAK, the processor is further configured to determine, in response to each of the plurality of received first packet transmissions, timing for transmitting a HARQ ACK/NAK to the base station for each of the plurality of received first packet transmissions, wherein the timing is deducible based on the system broadcast signaling.

5. The mobile station of claim 4,
wherein the processor is further configured to:
determine that the HARQ ACK/NAK for each of the plurality of received first packet transmissions coincide in one UL subframe based on the determined timing for the HARQ ACK/NAKs; and
transmit each of the HARQ ACK/NAKs for each of the plurality of received first packet transmissions in one UL subframe.

6. The mobile station of claim 5,
wherein, according to a different configuration, the processor is further configured to:
transmit, via the transmit circuitry, the HARQ ACK/NAKs for each of the plurality of received first packet transmissions;
receive, via the receive circuitry, an associated packet retransmission in response to each transmitted HARQ NAK for each of the plurality of received first packet transmissions, wherein each received first packet transmission and associated packet retransmission corresponds to a HARQ channel;

determine a first ordering of HARQ channels corresponding to the plurality of received first packet transmissions on DL subframes before HARQ ACK/NAK transmission on one UL subframe; and retain the first ordering for receiving packet retransmissions of the HARQ channels corresponding to the plurality of received first packet transmissions on DL subframes after HARQ ACK/NAK transmission.

7. The mobile station of claim 1,
wherein the processor is further configured to:
determine a resource location of a ACK/NAK channel for the mobile station for the HARQ ACK/NAK transmission, wherein the resource location of the ACK/NAK channel of the mobile station within a UL sub-frame is deduced from a HARQ channel number, an assigned DL resource of the received first packet transmission, and a number of UL ACK/NAK channels allocated.

8. An apparatus, comprising:
a memory;
and a processor in communication with the memory, wherein the processor is configured to:
receive system broadcast signaling, wherein the system broadcast signaling defines a set of parameters, and wherein the set of parameters are a function of a time division duplexing downlink/uplink (TDD DL/UL) subframe ratio;
receive a first packet transmission from a base station on a DL subframe, wherein the first packet transmission is one of a packet transmission or retransmission; and
determine, in response to the previously received first packet transmission, timing for transmitting a HARQ acknowledgment/negative acknowledgment (ACK/NAK) to the base station, wherein the timing is deducible based on the system broadcast signaling, wherein the timing comprises a configuration wherein a first set of downlink transmissions in a first set of consecutive downlink sub-frames are positively or negatively acknowledged in a subsequent first set of consecutive uplink transmission sub-frames, and wherein the first set of downlink transmissions that are not positively or negatively acknowledged in the subsequent first set of consecutive uplink transmission sub-frames are positively or negatively acknowledged in a subsequent second set of consecutive uplink transmission sub-frames subsequent to a second set of downlink consecutive transmission sub-frames, and wherein an order of retransmissions corresponding to the first set of downlink transmissions is different than the order of the first set downlink transmissions in the first set of consecutive downlink sub-frames to accommodate minimum ACK/NAK delay and retransmit delay.

9. The apparatus of claim 8,
wherein the set of parameters comprise a HARQ ACK delay.

10. The apparatus of claim 9,
wherein the set of parameters further comprise a retransmit delay and a number of HARQ channels.

11. The apparatus of claim 8,
wherein the first packet transmission is comprised in a plurality of first packet transmissions;

wherein the DL subframe is comprised in a plurality of DL subframes;

wherein, to receive the first packet transmission, the processor is further configured to receive each of the plurality of first packet transmissions from the base station on a different DL subframe of the plurality of DL subframes, wherein each of the first packet transmissions is one of a packet transmission or retransmission; and wherein, to determine the timing for transmitting the HARQ ACK/NAK, the processor is further configured to determine, in response to each of the plurality of received first packet transmissions, timing for transmitting a HARQ ACK/NAK to the base station for each of the plurality of received first packet transmissions, wherein the timing is deducible based on the system broadcast signaling.

12. The apparatus of claim 11,
wherein the processor is further configured to:
determine that the HARQ ACK/NAK for each of the plurality of received first packet transmissions coincide in one UL subframe based on the determined timing for the HARQ ACK/NAKs; and
transmit each of the HARQ ACK/NAKs for each of the plurality of received first packet transmissions in one UL subframe.

13. The apparatus of claim 12,
wherein, according to a different configuration, the processor is further configured to:
transmit the HARQ ACK/NAKs for each of the plurality of received first packet transmissions;
receive an associated packet retransmission in response to each transmitted HARQ NAK for each of the plurality of received first packet transmissions, wherein each received first packet transmission and associated packet retransmission corresponds to a HARQ channel;
determine a first ordering of HARQ channels corresponding to the plurality of received first packet transmissions on DL subframes before HARQ ACK/NAK transmission on one UL subframe; and
retain the first ordering for receiving packet retransmissions of the HARQ channels corresponding to the plurality of received first packet transmissions on DL subframes after HARQ ACK/NAK transmission.

14. The apparatus of claim 8,
wherein the processor is further configured to:
determine a resource location of a ACK/NAK channel for the mobile station for the HARQ ACK/NAK transmission, wherein the resource location of the ACK/NAK channel of the mobile station within a UL sub-frame is deduced from a HARQ channel number, an assigned DL resource of the received first packet transmission, and a number of UL ACK/NAK channels allocated.

15. A base station, comprising:
a baseband processor;
one or more antennas;
transmit circuitry coupled to the baseband processor and the one or more antennas; and
receive circuitry coupled to the baseband processor and the one or more antennas;
wherein the base station is configured to:
transmit system broadcast signaling, wherein the system broadcast signaling defines a set of parameters, and wherein the set of parameters are a function of a time division duplexing downlink/uplink (TDD DL/UL) subframe ratio;

transmit a first packet transmission to a mobile station on an DL subframe, wherein the first packet transmission is one of a packet transmission or retransmission; and determine, in response to the previously transmitted first packet transmission, timing for receiving a hybrid automatic repeat request (HARQ) acknowledgment/negative acknowledgment (ACK/NAK) from the mobile station, wherein the timing is deducible based on the system broadcast signaling, wherein the timing comprises a configuration wherein a first set of downlink transmissions in a first set of consecutive downlink sub-frames are positively or negatively acknowledged in a subsequent first set of consecutive uplink transmission sub-frames, and wherein the first set of downlink transmissions that are not positively or negatively acknowledged in the subsequent first set of consecutive uplink transmission sub-frames are positively or negatively acknowledged in a subsequent second set of consecutive uplink transmission sub-frames subsequent to a second set of downlink consecutive transmission sub-frames, and wherein an order of retransmissions corresponding to the first set of downlink transmissions is different than the order of the first set downlink transmissions in the first set of consecutive downlink sub-frames to accommodate minimum ACK/NAK delay and retransmit delay.

16. The base station of claim 15,
wherein the set of parameters comprise a HARQ ACK delay.

17. The base station of claim 16,
wherein the set of parameters further comprise a retransmit delay and a number of HARQ channels.

18. The base station of claim 15,
wherein the first packet transmission is comprised in a plurality of first packet transmissions;
wherein the DL subframe is comprised in a plurality of DL subframes; wherein the base station configured to:
transmit the first packet transmission further comprises transmitting each of the plurality of first packet transmissions from the base station on a different DL subframe of the plurality of DL subframes, wherein each of the first packet transmissions is one of a packet transmission or retransmission; and
determine the timing for receiving the HARQ ACK/NAK further comprises determining, in response to each of the plurality of transmitted first packet transmissions, timing for receiving a HARQ ACK/NAK from the mobile station for each of the plurality of transmitted first packet transmissions, wherein the timing is deducible based on the system broadcast signaling.

19. The base station of claim 18,
wherein the base station is further configured to:
determine that the HARQ ACK/NAK for each of the plurality of transmitted first packet transmissions coincide in one UL subframe based on the determined timing for the HARQ ACK/NAKs; and
receive each of the HARQ ACK/NAKs for each of the plurality of transmitted first packet transmissions in one UL subframe.

20. The base station of claim 15, wherein the base station is further configured to: determine a recourse location of a ACK/NAK channel for the mobile station for the HARQ ACK/NAK reception, wherein the resource location of the ACK/NAK channel of the mobile station within a UL sub-frame is deduced from a HARQ channel number, an assigned DL resource of the received first packet transmission, and a number of UL ACK/NAK channels allocated.

* * * * *